(12) United States Patent
Colombo et al.

(10) Patent No.: US 11,862,972 B2
(45) Date of Patent: *Jan. 2, 2024

(54) COLLABORATIVE SERVICE PROVISIONING OF DISTRIBUTED ENERGY RESOURCES

(71) Applicant: DERNetSoft Inc., San Francisco, CA (US)

(72) Inventors: Alberto Colombo, Walnut Creek, CA (US); John Rogers, Jersey City, NJ (US)

(73) Assignee: DERNetSoft Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/734,546

(22) Filed: May 2, 2022

(65) Prior Publication Data
US 2022/0263342 A1 Aug. 18, 2022

Related U.S. Application Data

(63) Continuation of application No. 17/018,941, filed on Sep. 11, 2020, now Pat. No. 11,322,977.

(51) Int. Cl.
*H02J 13/00* (2006.01)
*H02J 3/00* (2006.01)
*H02J 3/38* (2006.01)

(52) U.S. Cl.
CPC ........ *H02J 13/00004* (2020.01); *H02J 3/001* (2020.01); *H02J 3/003* (2020.01);
(Continued)

(58) Field of Classification Search
CPC ...... H02J 13/00004; H02J 3/001; H02J 3/003; H02J 3/004; H02J 3/0075; H02J 3/381;
(Continued)

(56) References Cited

U.S. PATENT DOCUMENTS

| 2014/0076810 A1* | 3/2014 | Jessop | C02F 1/445 |
| | | | 210/207 |
| 2014/0277599 A1* | 9/2014 | Pande | H02J 3/32 |
| | | | 700/22 |

(Continued)

OTHER PUBLICATIONS

Notice of Allowance dated Mar. 23, 2022, U.S. Appl. No. 17/018,941.

*Primary Examiner* — Ziaul Karim
(74) *Attorney, Agent, or Firm* — Vierra Magen Marcus LLP

(57) ABSTRACT

A system and method to join distributed energy resources (DER) to achieve common objectives is provided. The present technology organizes and/or aggregates DERs by routing a (DER) program request for resources to DER contributors capable of responding to and performing the request using a routing system. The system accesses a plurality of DER profiles, each profile associated with a DER contributor capable of contributing a resource to the request, and calculates an initial value for each DER profile based on request attributes and scoring metrics associated with the profile. The system then calculates a fitness metric for each DER profile based on the initial value using a neural network having weights based on the plurality of performance indicators and selects the DER profile and contributors to whom to route the request.

20 Claims, 20 Drawing Sheets

(52) U.S. Cl.
CPC ............ *H02J 3/004* (2020.01); *H02J 3/0075* (2020.01); *H02J 3/381* (2013.01); *H02J 13/00001* (2020.01); *H02J 13/00032* (2020.01); *H02J 2203/10* (2020.01)

(58) Field of Classification Search
CPC ........... H02J 13/00001; H02J 13/00032; H02J 2203/10; H02J 2300/24; H02J 2300/28; G06Q 10/063; G06Q 10/101; G06Q 50/06; Y02B 10/10; Y02E 40/70; Y04S 10/123
See application file for complete search history.

(56) References Cited

U.S. PATENT DOCUMENTS

| | | | |
|---|---|---|---|
| 2017/0032098 A1* | 2/2017 | Ghorbanian | A61B 5/7282 |
| 2018/0088616 A1* | 3/2018 | Aggarwal | G06Q 50/06 |
| 2019/0324415 A1* | 10/2019 | Frolik | H02J 3/00 |
| 2019/0356164 A1* | 11/2019 | Ghaemi | G06Q 10/00 |

* cited by examiner

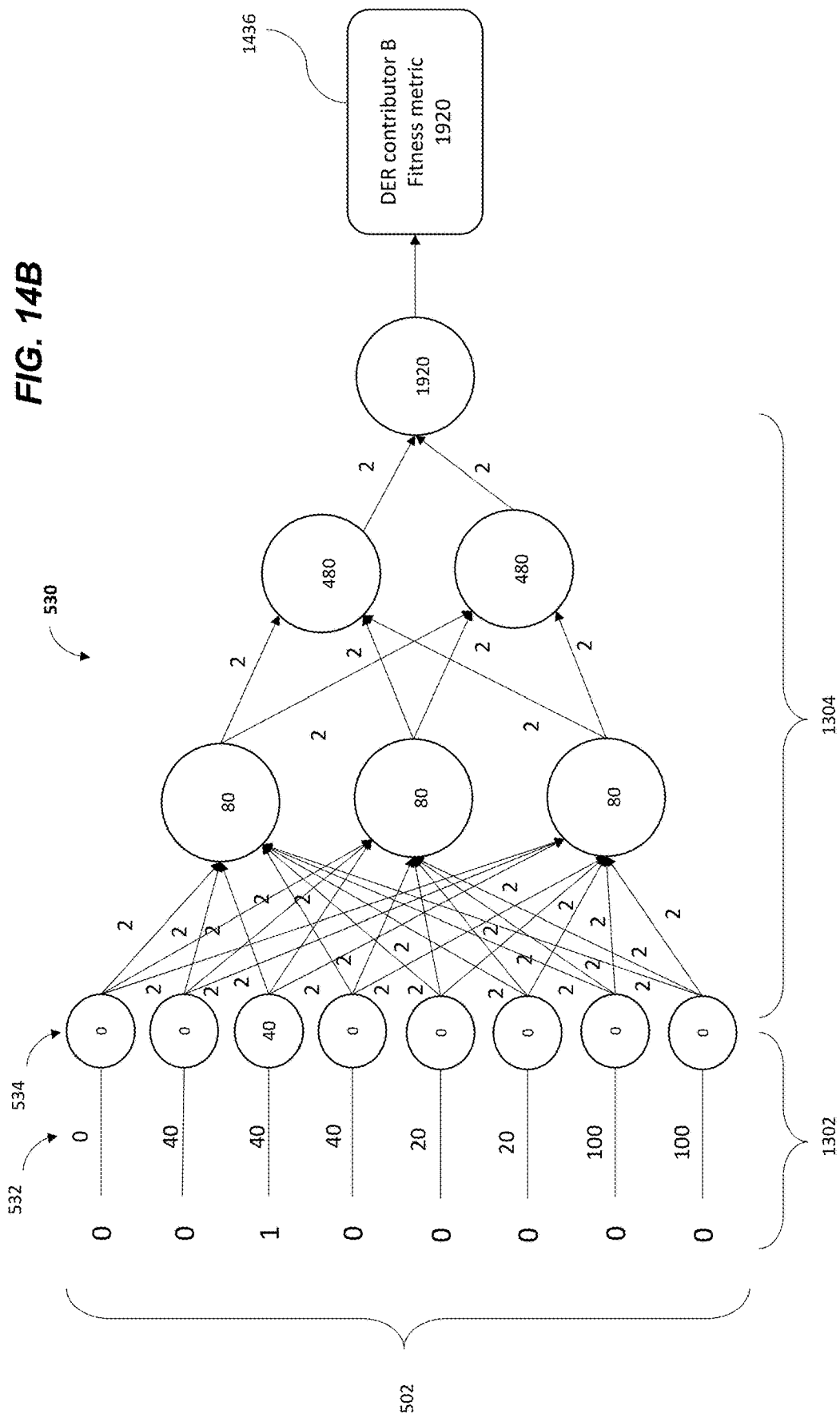

COLLABORATIVE SERVICE PROVISIONING OF DISTRIBUTED ENERGY RESOURCES

CLAIM OF PRIORITY

This application is a continuation of, and claims priority to, U.S. patent application Ser. No. 17/018,941, entitled "COLLABORATIVE SERVICE PROVISIONING OF DISTRIBUTED ENERGY RESOURCES", filed Sep. 11, 2020, which application is incorporated by reference herein in its entirety.

FIELD

The disclosure generally relates to systems and methods for effective engagement, coordination, and collaboration of a variety of Distributed Energy Resources (DERs) over various communication channels.

BACKGROUND

Climate change is transforming the energy market as communities, cities, states, and industries are moving to reduce carbon from their energy sources. There are a number of driving forces in the market: use more renewable energy, transition to electrification of energy loads including electric cars, use more efficient technologies, and optimize load demand, while using the internet of things infrastructure to sustain a stable electric grid. Distributed Energy Resources (DERs) are a catalyst technology for higher levels of intermittent renewable energy on the grid. DERs are physical and virtual assets that are deployed across the distribution grid, which can be used individually or aggregated to provide value to the grid, individual customers, or both. Distributed energy resources generally comprise renewable energy units or systems that are commonly located at houses or businesses to provide them with power. Common examples of DER include rooftop solar PV units, battery storage, thermal energy storage, electric vehicles and chargers, smart meters, and home energy management technologies.

DERs promise lower costs, more local resiliency of electric supply control to meet demand and more electricity supply stability. Reliability has emerged as a major concern as the grid struggles to guarantee supply to meet increasing demand, particularly during peak periods when expensive backup generation is required to keep the lights on.

Assigning requests to distributed energy resources of a logical or physical community is typically performed by limited member engagement or by a DER program manager who supervises a select number of members. These methods become inefficient as the number of available distributed energy resources expands or as the data about DER becomes outdated and/or missing. Further, some DERs, such as those that are small or are not managed by skilled energy personnel, may be unable to participate in available DER programs within their energy community.

SUMMARY

According to one aspect of the present disclosure, the technology includes a computer implemented method comprising: receiving a Distributed Energy Resource (DER) program request for resources, the request including at least one normalized request attribute; accessing a plurality of DER profiles, each profile associated with a DER contributor capable of contributing a resource to the request, and including a plurality of attribute scoring metrics and a plurality of performance indicators of the DER contributor; calculating an initial value for each DER profile based on the at least one normalized request attribute and the plurality of scoring metrics; calculating a fitness metric for each DER profile based on the initial value using a neural network having weights based on the plurality of performance indicators; selecting one or more DER profiles based on a stochastic model using the fitness metric; and routing the DER program request to one or more DER contributors associated with the selected one or more DER profiles. Other embodiments of this aspect include corresponding computer systems, apparatus, and computer programs recorded on one or more computer storage devices, each configured to perform the actions of the methods.

Implementations may include a method further including the updating of at least one of the pluralities of scoring metrics of the selected DER profile based on whether a response to the DER program request provided by the DER contributor was validated and accepted. In another aspect, implementations include any of the foregoing methods and further including updating the scoring metrics based on DER data collection and analysis, and where the calculating an initial value is based on updated scoring metrics. In another aspect, implementations include any of the foregoing methods and further including updating of at least one of the plurality of performance indicators based on: whether the DER contributor accepts the request; or an elapsed amount of time for the selected DER contributor to accept the request; or whether the DER contributor provided a response to the request; or an elapsed amount of time for the selected DER contributor to provide a response to the request. In another aspect, implementations include any of the foregoing methods and further including pre-selecting of a portion of the plurality of DER profiles based on the fitness metric. In another aspect, implementations include any of the foregoing methods where the stochastic model is based on one of: a lottery or a gaussian distribution. In another aspect, implementations include any of the foregoing methods and further including dividing the request into one or more sub-requests, each sub request having at least one request attribute. In another aspect, implementations include any of the foregoing methods and where the accessing a plurality of DER profiles, calculating an initial value for each DER profile, calculating a fitness metric for each DER profile, selecting one or more DER profiles, and routing are performed for each sub-request. Implementations of the described techniques may include hardware, a method or process, or computer software on a computer-accessible medium.

Another general aspect includes a system including: a non-transitory memory storage including instructions; and one or more processors in communication with the memory storage, where the one or more processors execute the instructions to: receive a DER program request for resources, the request including at least one normalized request attribute; access a plurality of DER profiles, each profile associated with a DER contributor capable of providing a resource to address the request and including a plurality of attribute scoring metrics and a plurality of performance indicators of the DER contributor; calculate updated DER scoring metrics to be used in each profile; calculate an initial value for each DER profile based on the at least one normalized request attribute and the plurality of scoring metrics; calculate a fitness metric for each DER profile based on the initial value using a neural network having weights based on the plurality of performance indicators; select one or more DER profiles based on a stochastic model using the fitness metric; and map one or more of the DER profiles to actionable tasks that each DER is capable of making according to a DER contributor skill set, and route the request to one or more DER contributors associated with the one or more DER profiles. Other embodiments of this aspect include corresponding computer systems, apparatus, and computer programs recorded on one or more computer storage devices, each configured to perform the actions of the methods.

Implementations may include a system where the one or more processors execute the instructions to calculate the fitness metric for each DER profile using unsupervised learning in the neural network. In another aspect, implementations include any of the foregoing systems where the one or more processors execute the instructions to calculate the initial value for each DER profile using supervised learning in the neural network. Implementations may include any of the foregoing systems where the one or more processors execute the instructions to divide the request into one or more sub-requests, each sub request having at least one request attribute. Other implementations may include any of the foregoing systems where the one or more processors execute the instructions for each sub-request to access the plurality of DER profiles, calculate the initial value for each DER profile, calculate the fitness metric for each DER profile, select one or more DER profiles, and route each sub-request. In another aspect, implementations may include any of the foregoing systems where the one or more processors execute the instructions update of at least one of the pluralities of scoring metrics of the selected DER profile based on whether a response to the DER program request provided by the DER contributor was validated and accepted. Still other aspects may include any of the foregoing systems system where the one or more processors execute the instructions update the scoring metrics based on DER data collection and analysis, and where the calculating an initial value is based on updated scoring metrics. Further implementations may include any of the foregoing systems where the one or more processors execute the instructions to update of at least one of the plurality of performance indicators based on: whether the DER contributor accepts the request, or an elapsed amount of time for a DER contributor to accept the request, or whether the DER contributor provided a response to the request, or an elapsed amount of time to accept the request. Implementations of the described techniques may include hardware, a method or process, or computer software on a computer-accessible medium.

Another aspect of the technology includes a computer readable medium having embodied thereon instructions executable by a processor configured to route and allocate a DER program request, the instructions causing the processor to perform a method including: receiving a DER program request for at least one DER resource, the request including at least one normalized request attribute; accessing a plurality of DER profiles, each profile associated with a DER contributor capable of contributing a resource to the request and including a plurality of attribute scoring metrics and a plurality of performance indicators of the DER contributor; calculating an initial value for each DER profile based on the at least one normalized request attribute and the plurality of scoring metrics; calculating a fitness metric for each DER profile based on the initial value using a neural network having weights based on the plurality of performance indicators; selecting one or more DER profile profiles based on a stochastic model using the fitness metric; and routing the request to the one or more DER contributors associated with the one or more profiles. Other embodiments of this aspect include corresponding computer systems, apparatus, and computer programs recorded on one or more computer storage devices, each configured to perform the actions of the methods.

Implementations may include the computer readable medium including instructions performing a method further including dividing the request into one or more sub-requests, each sub request having at least one request attribute. Implementations may include the computer readable medium including instructions performing any of the foregoing methods where, for each sub request, the accessing a plurality of DER profiles, calculating an initial value for each DER profile, calculating a fitness metric for each DER profile, selecting one or more DER profiles, and routing are performed Implementations may include the computer readable medium including instructions performing any of the foregoing methods where the method further includes calculating the fitness metric for each DER profile using unsupervised learning in the neural network and calculating the initial value for each DER profile using supervised learning in the neural network.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate the same or similar elements.

FIG. 14B is a depiction of a neural network associated with a second DER contributor according to various embodiments.

DETAILED DESCRIPTION

Figure 1A:
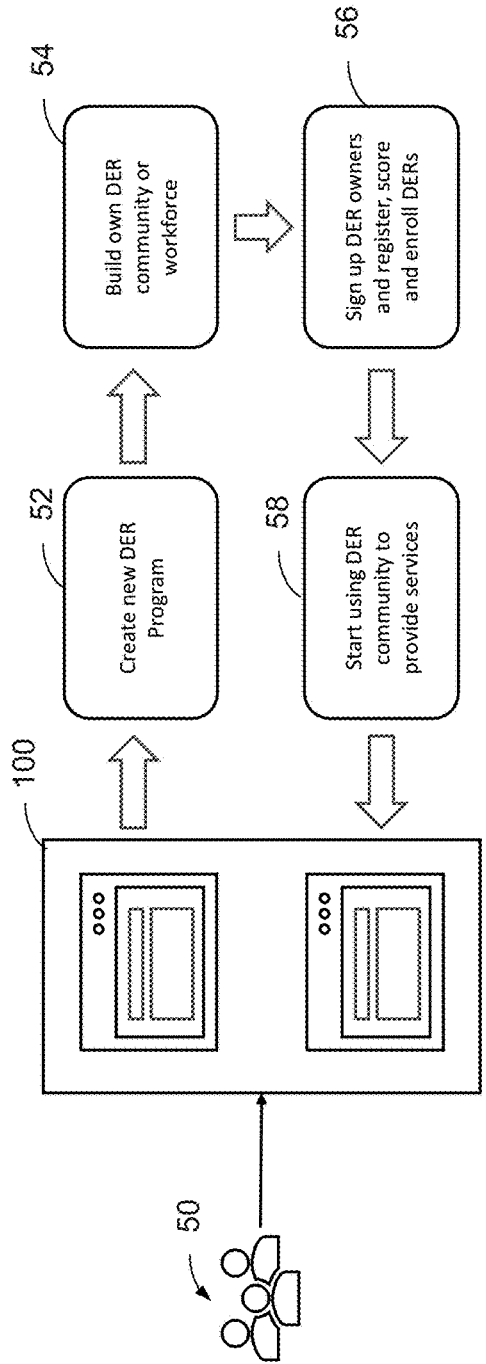
FIG. 1A is an overview diagram illustrating a use of the present technology.

Technology is provided for a system and method to join distributed energy resources (DER) to achieve common objectives. The present technology organizes and/or aggregates DERs in order to achieve common and/or complex objectives, letting the promoter of the initiative to model and design the program. This technology can be applied to Energy Efficiency (EE), Demand Side Management (DSM) or Distributed Energy Resources Management System (DERMS) processes.

A DER program may comprise a series of business rules, agreements and engagement processes to manage and distribute DERs. The technology allows for a program manager or administrator to construct a new DER program through the use of user interfaces and templates. DER resources may include but are not limited to Photo-voltaic (PV) solar, Fuel Cells, Energy Storage Systems, Irrigation Pumps, Smart Thermostats, and the like. In DER communities, a limited amount of data may be known about actual nameplate capacity, technology type, locational value, owner preferences, or contributors' behaviors. In some embodiments, DER contributors also include non-human systems. For example, a DER request may be routed and allocated to a non-human system such as a website, an internet of things device, an external system, or other automated system.

The technology allows, if specified in the DER program, for the splitting of a DER request into a series of smaller requests that several contributors can respond to and collect each the responses in order to compose a complete an overall response to the original DER request. The technology provides tools and user interfaces to: (1) model the main request, building a schema of the sub-requests it is composed of the constraints existing between sub-requests, and the characteristics of each sub-request, in order to assign each one to the most appropriate DER; (2) engage, profile and maintain the DER aggregation by managing various communication channels from the system to and from each DER and between DERs, both anonymously or explicitly; (3) run the modeled program against a DER aggregation. starting with the creation and assignment of the sub-requests, the monitoring and validation of single result, the reconciliation and aggregation of responses, the application of different levels of priority to every sub-request if required, the maintaining of statistics of responses done and left to do, and the managing of priorities and time of expiration of sub-requests, data and statistics; and (4) administrate and orchestrate whole-system monitoring of the percentage of requests completed for each program, viewing the aggregated response and related key performance indicators, managing rewarding policies for DERs, managing accounting and billing policies, creating and maintaining security and privacy policies for DERs, and defining and activating communication channels and interfaces for DERs or users of the platform.

DER program manager users can leverage existing templates based on previous knowledge bases to create DER programs rather than starting from scratch, thereby saving time and cost.

Designing a DER program also requires explicitly defining the characteristics requested of the DER resource contributors. DERs must also be profiled according to defined skill sets. The skill sets allow the system to match the most appropriate contributor to execute each sub-request. The speed, level of quality, and other definable attributes can be associated with each DER contributor's response in order to trace the activities and generate statistics but can also be used to update DERs' scores and characteristics. For example, if a program requests frequency regulation, DERs will likely need skills such as "having an energy storage system" and "response time". During system operation, after each request and completed response in a series of requests and responses for the program, the system will update a score of each DER and maintain statistics and input for a rewarding component of the system. The statistics allow the system to assign each sub-request to the most appropriate DER contributor and improve the global efficiency of the system.

With a large number of DERs, there is also a need for evaluating and scoring each contributor to optimize their engagement and meet the requirements of each request requirement and assure maximum quality of service and flexibility. Once the demand for DER grows, there is a need to manage different types of programs and their requests, split them into sub-requests and aggregate results for performance and reliability optimization.

Thus, the technology further provides a routing system (sometimes referred to herein as a "routing algorithm") to manage DER requests with DER resources. In energy communities that include a large number of DERs which are registered to provide services in DER programs, requests are routed and allocated to the DER contributors or a group of the DER contributors. A DER request may include various requests defined in terms of request types and having request attributes. A DER request may include, for example, a demand response event, a resource adequacy request, a load curtailment, a greenhouse gas emission reduction, new job creation, or the like. To route and allocate DER program requests to DER contributors in an energy community, a request including normalized request attributes is received by a routing system. The normalized request attributes correspond to scoring metrics within a profile of each DER contributor. In accordance with the technology, a supervised learning portion of a neural network calculates an initial value based on the scoring metrics of each DER contributor and the normalized request attributes. The initial value associated with each DER contributor profile is input into an unsupervised learning portion of the neural network having weights. In the unsupervised learning portion, the weights are based on measures of behavior of a DER contributor, expressed quantitatively by performance indicators within the profile of each DER contributor. For each profile, a neural network is generated to calculate a fitness metric. To distribute requests among the DER contributors, a stochastic model is used to select a set of profiles based in part on the fitness metric and in part on the request attributes. The request is then routed to the DER contributors associated with the selected set of profiles and data results are collected, measured, and validated from each individual and the selected DER contributor.

FIG. 1A shows overview of the use of the present technology. In one embodiment, a program designer or administrator (i.e. one or more users 50) accesses the system 100 via a web interface over internet connection using a common web browser. It should be recognized that any number of different types of interfaces may be provided, the system 100 may be a standalone system not connected to a network or be connected to a number of other systems (and the DERs) by a local or other network connection. The interface for the DER program designer and administration allows every registered DER manager user to start, promote, and run a new DER program for a community of available distributed energy resources.

By way of example, a program manager can create a new DER program 52, by selecting pre-defined templates from a system repository or by starting from scratch. After completing all the required DER program personalization and configuration tasks (i.e. defining business rules, contract and reward policies, DER skills, and escalation process), the DER program manager can start promoting it and building a DER community at 54. This includes engaging DER contributors to subscribe to the platform, sign the service enrollment contract, and register their DERs to be contributors 56. Once the DER community is formed, with DER contributors subscribed, and their DERs registered, analyzed, and scored, the system is ready to operate at 58, and the DER manager can start using the system to provide services, creating requests through the portal that are dispatched downstream to the DER contributors which can use their portal access to monitor their DER operations (i.e. response status, service level, rewards, etc.).

Figure 1B:
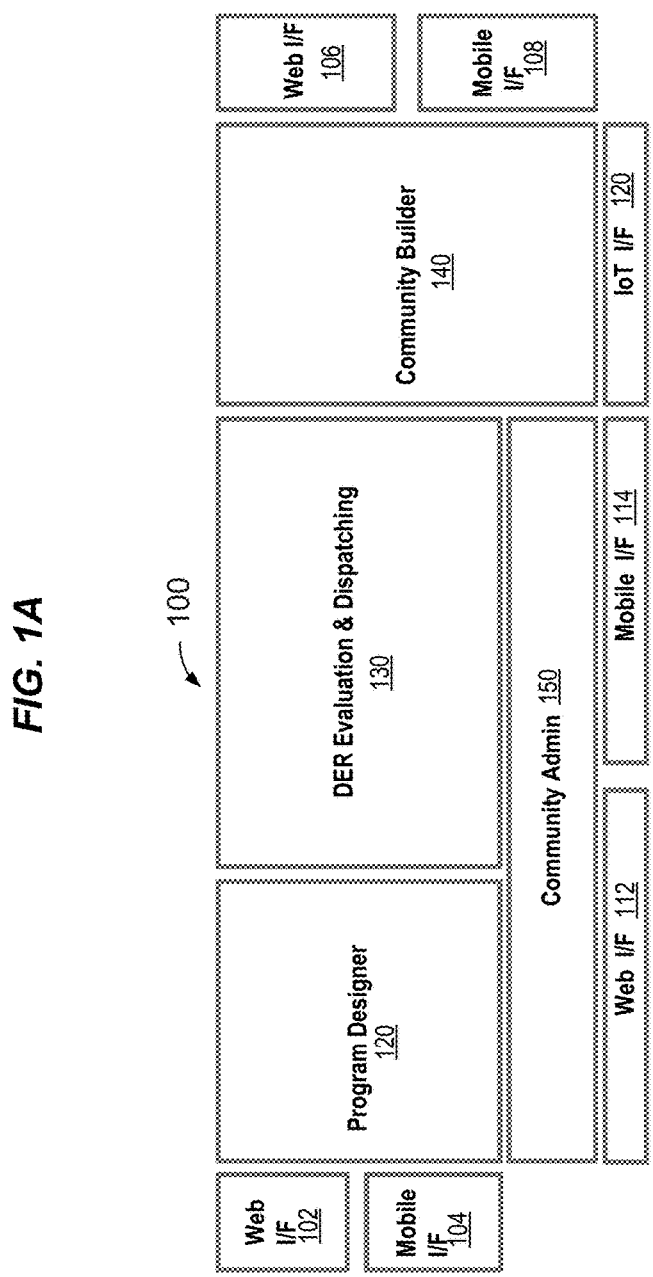
FIG. 1B is a high-level architecture block diagram.

FIG. 1B shows an overall architecture of the system 100 that implements the present technology. The system comprises a program designer component 120, a DER evaluation and dispatching component 130, a community builder 140 and a community admin component 150. Various mobile and web interfaces 102, 104, 106 and 108, as well as an internet of things (IoT) interface 120 may be included in the system. The core of the system is the DER evaluation and dispatching component 130 which includes the DER routing system described herein. In one aspect, the DER evaluating and dispatching component 130 includes a DER scoring engine, routing system including a matching algorithm and a set of workflow engines which are able to interpret program schemas, business rules and constraints defined in the DER program.

The program designer 120 comprises a tool to create and edit programs for DERs where business rules, legal contracts, types of resources, assignments, and rewarding policies are defined. These DER programs can be designed from scratch or, starting from a set of program templates, available in a system library. The program designer 120 is accessible to an administrator (402 in FIG. 4) via a web interface 102 or mobile interface 104. Program designer 120 allows program designers and administrators to create or modify programs, interact with available applications, and monitor active community members and processes. After a program is designed and instantiated on the system 100 the program designer 120, the community administrator may create DER users who interact with the program run by system and register distributed energy resources with the program. Users, DERs, business rules, service contracts, workflows and all other data are represented as schemas or data schemas in the system.

The community builder 140 comprises tool to manage the supply side of the DER program, providing a set of programs to engage and subscribe customers, register and analyze available distributed energy resources, collect data from various data sources and external devices, and enable DER sale transactions with technology vendors in a digital marketplace. The Community builder 140 is accessible to users (404 in FIG. 4) via a web interface 106 or mobile interface 108.

The community administration component 150 is a tool to manage the system security for user access and identity management, monitor the operations at both program and DER contributors' level and manage rewarding DER contributors.

Figure 2:
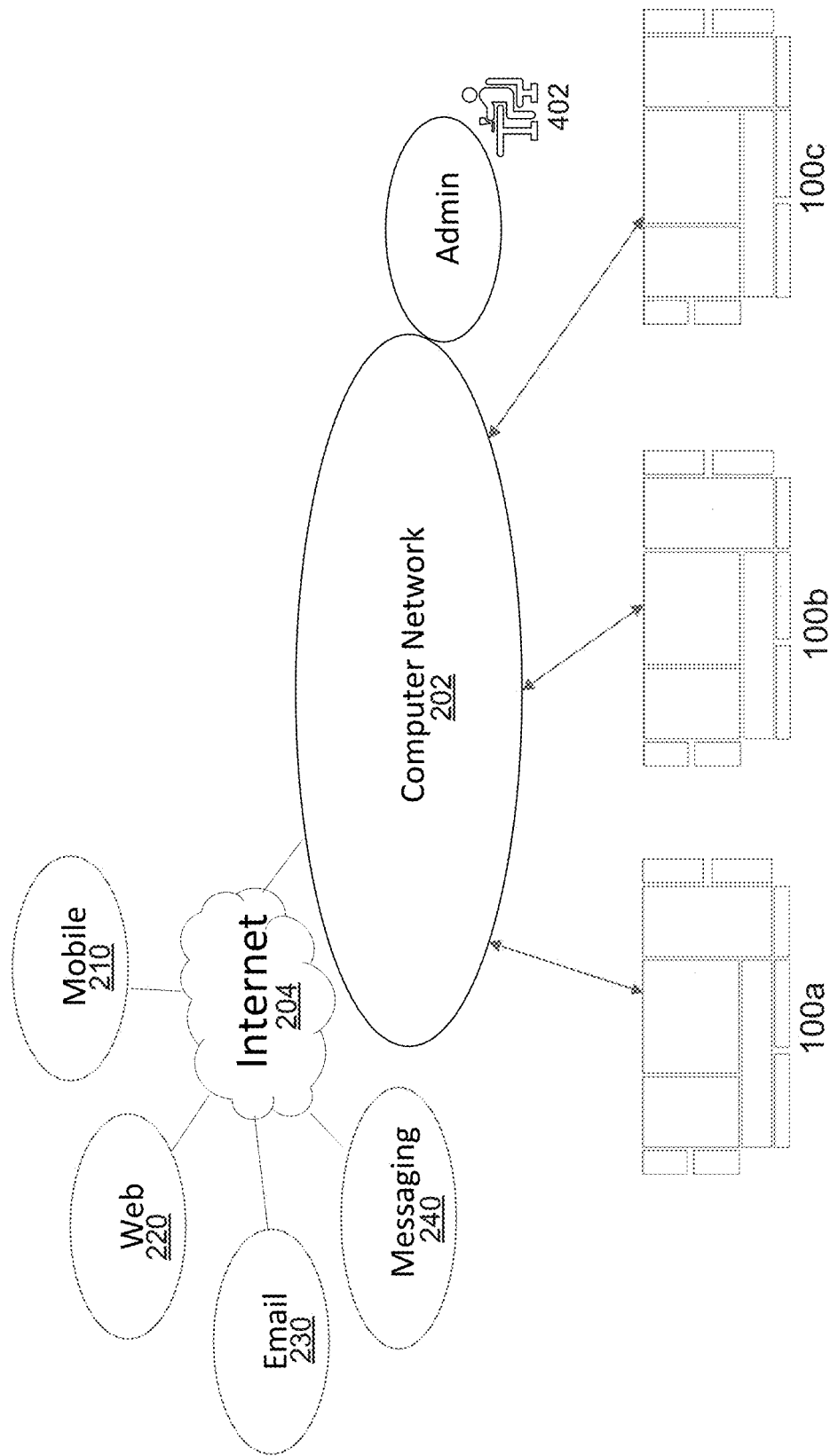
FIG. 2 is general overview of the system and the actors involved.

FIG. 2 shows how various components work together in a networked environment, and how one or more instances of system 100 may be accessible to various users. One or more instances of the system 100a, 100b, 100c may be coupled by a network 202 and can work in parallel, implementing different DER programs based on different business scenarios and orchestrating several DER contributors. The network 202 may itself be coupled to a wide area network such as the internet 204, providing various types of client access including a mobile interface 210, web interface 220, email interface and messaging interface 240. DERs can be connected directly to the system or accessed through the Internet, via cloud access channels or whatever IoT application programming interface (API) channel the application instance integrates over the communication layer. A single application instance has a set of rules determining users' grants of access differentiated per access channel. Users and DER contributors can interact with the system through different access channels. For example, a DER contributor to whom a sub-request has been assigned via an SMS notification can check the details of the request accessed with mobile device interface, and respond via the mobile interface, and/or switch to another interface such as a personal computer to complete the sub-request. User credentials will grant unique access even if performed from different access channels.

Figure 3:
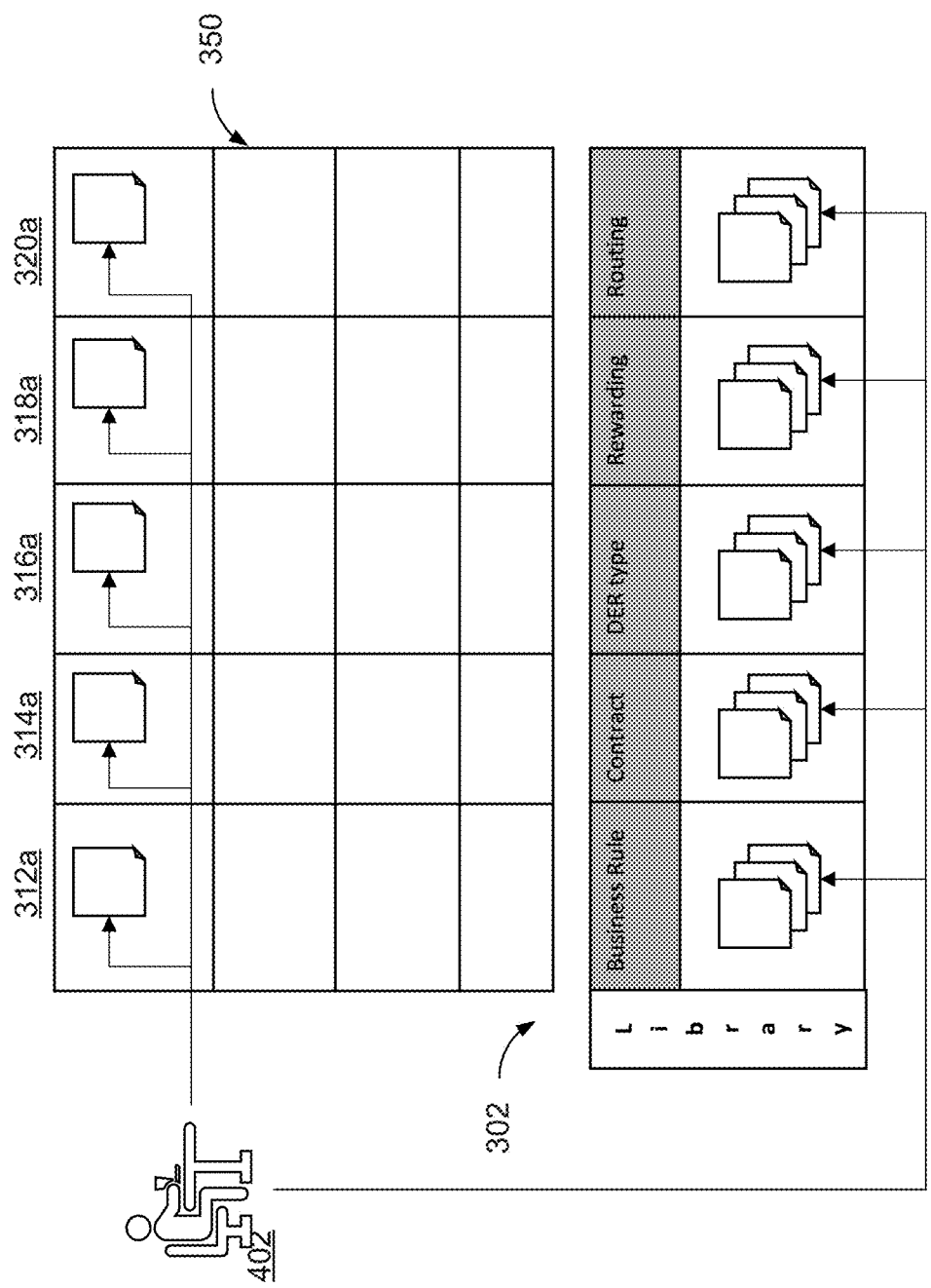
FIG. 3 is a functional diagram describing the DER program instance creation starting from the template's library.

FIG. 3 illustrates conceptually how a new DER program is designed and implemented. The system includes a library 302 including templates for business rules 312, contracts 314, DER types 316, rewards 318 and routing rules 320. To reduce the time and skill required to create a new DER program, an intuitive user interface for users provides access to the library 302 to allow the user to select and construct a specific DER program 350 comprising a set of business rules 312a, distributed energy resource types 316a, contracts 314a, rewarding policies 318a and routing preferences 320a. The administrator or program designer 402 builds the DER program 350 by selecting the most appropriate template from a library 302 of pre-designed programs. Then, the designer can customize or personalize elements such as business rules, reward or contract policies, DER type, etc. to better reflect the specific program requirements. The editing environment may comprise a graphic user interface, allowing the designer to build the DER program without having to deal with low level code.

Once such a DER program is created, the solution can obtain the contribution of engaged DER contributors. A request from a DER program may or may not be solved by the DER contributors. Within any defined program (350), a request may or may not converge toward an optimal solution depending on the type of request. A main request can be decomposed into simpler sub-requests and sent to contributors which respond so the main request can have a solution as soon as each sub-request is completed. For example, a typical Energy Storage System (ESS) grid service use case is frequency regulation, which requires high frequency data and quick response time. In this use case, a utility program administrator may need to quickly send a request to regulate frequency in a geographic area where imbalances are increasing. As such, they would send a main request to all the known DER contributors within the geographic area, and the system would decompose the main request to target only those DERs that have an ESS and are able to respond within a certain time period. These ESS DERs would each perform a quick ramp up or ramp down based on the grid request requirement, and in aggregate the overall grid frequency would converge back to nominal rates. In another embodiment a demand/supply matching system allows a multitude of requests to be sent to a multitude of DER contributors. As another example, a resource adequacy request may be sent to DER contributors in an area of high solar PV penetration. As the solar production decreases late in the day, these other DERs (ESS, fuel cell, etc) may be required to ramp up to meet demand, and the main request for X kW in supply would be evenly split among Y contributors, where each contributor is able to supply X/Y kW to the overall request.

Figure 4:
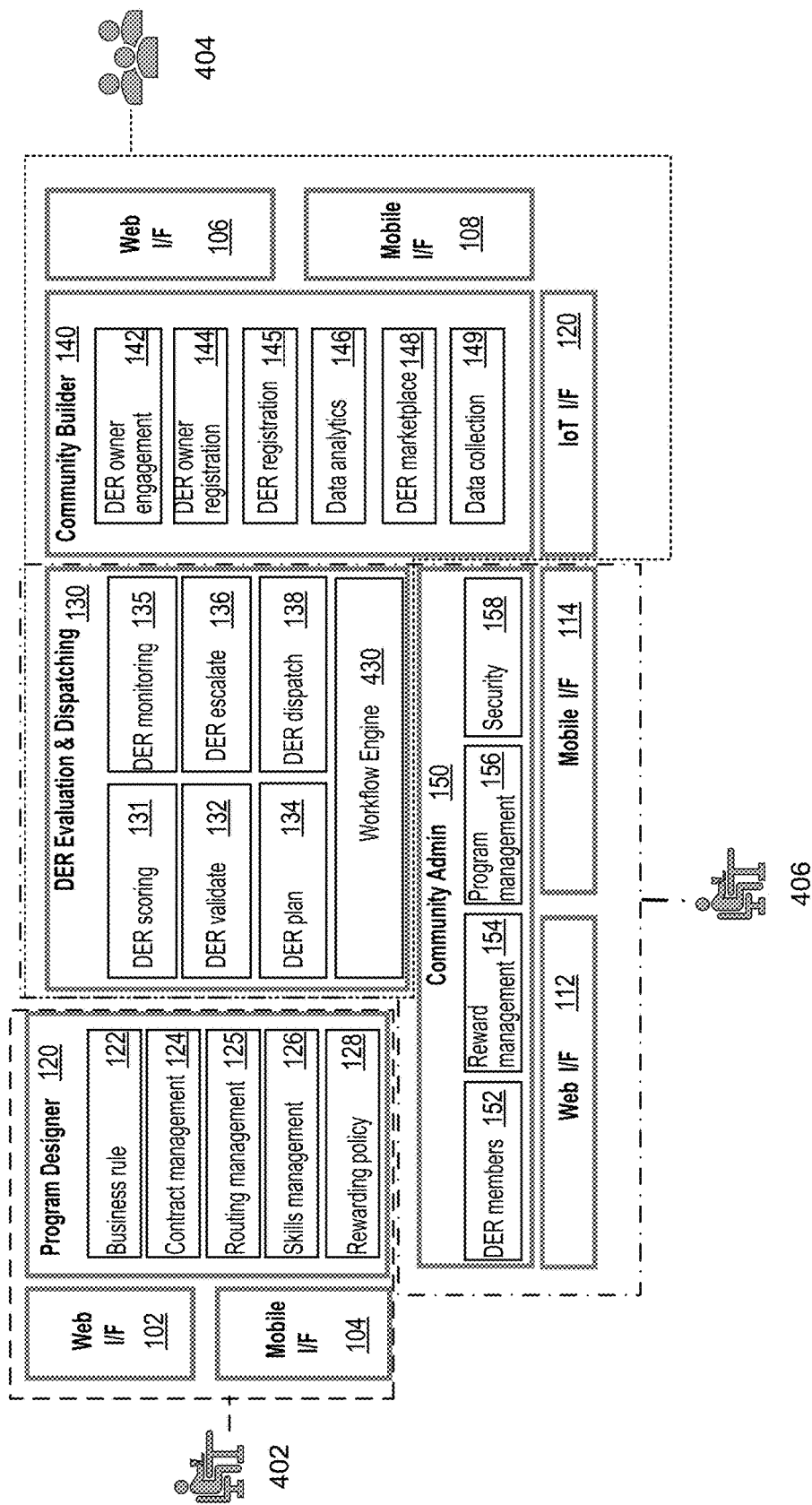
FIG. 4 is an architecture block diagram depicting additional elements of a system architecture.

FIG. 4 is a more detailed representation of the architecture of the system 100 and illustrates how various individuals (administrators, managers, designers, DER contributors) interact with the system 100. An administrator or program designer 402 generally interacts with the DER program designer tool 120. The program designer 120 may include a library (such as library 302) of business rules 122, contract templates 124, routing preferences 125, skills 126 and reward policies 128. It should be understood that the elements contained in the library are illustrative only and many additional types of templates may be included therein as the needs of DER programs change over time.

DER program creation is performed through the DER program designer 120. The access to the program designer 120 is made by a presentation layer which lets administrators and designers 402 interact through different user interface channels such as, but not limited to, a web interface 102 and mobile interface 104. Changes to a program can be immediately applied or stored for future use. If a change impacts a deployed program, the administrator can determine whether to let the program terminate with the previous behavior or change it immediately. Every applied change modifies the DER program design. DER program modifications include business rules, DER types, contract and rewarding policies, and priority and routing policies. With the program designer 120, is possible to change the way the program creates requests, assigns sub-requests, allows the DER contributors interact with the system, rewards or penalizes a contributor, and controls the way a DER contributor subscribes to a contract. It can also monitor DER contributor service performance and service level agreement. The user interface to the DER program designer 120 also allows access to previews of the DER program before its rollout in the marketplace, giving a final overview for confirmation of what will be run and presented to each DER contributor before deploying it in the marketplace.

Also shown in FIG. 4 are the components of system 100 generally utilized by a program manager or managers 406 (who may be the same as or different than the designer/administrator 402). Managers 406 interact with DER evaluation and dispatching component 130 and the community administration component 150. The DER evaluation and dispatching component 130 includes a scoring component 131, a validation component 132, a plan component 134, a monitoring component 135, an escalate component 136 and a dispatch component 138. The DER evaluation and dispatching component 130 also includes is a workflow engine 430 which runs each single request made to a DER program, links different DER sub requests, and orchestrates the overall program. The DER scoring facility 131 tracks profiles and performances of DER contributors of the program in order to optimize the sub request routing and assignment activity.

DER evaluation and dispatching plan component 130 contains the sub-components which a data model containing all information needed to run DER requests according to specific business processes defined for the DER program. The DER evaluation and dispatching component 130 utilizes workflows to select the DER contributors most appropriate for the specific request. DER monitoring 135 tracks and DER validation 132 validates each DERs performance over time allowing for continuous DER scoring updates, along with skill and rewarding management.

As discussed below, the plan 131, scoring 132 and dispatching 138 components may take the form of a routing system which, based on a specific set of DER program goals and a set of available DER profiles, splits a complex DER request into sub-requests, if the DER program required it, then organizes and assigns sub-requests to the available DER contributors, thereby maximizing the result in terms of time, cost, and user satisfaction in the planning and operational dispatch process. Even if a DER program's rules and design do not change until an administrator changes them, the behavior of the system may change over the life of the program because the program may evolve to adapt itself to the program requests and DER contributor skills, availability, and characteristics.

Figure 5:
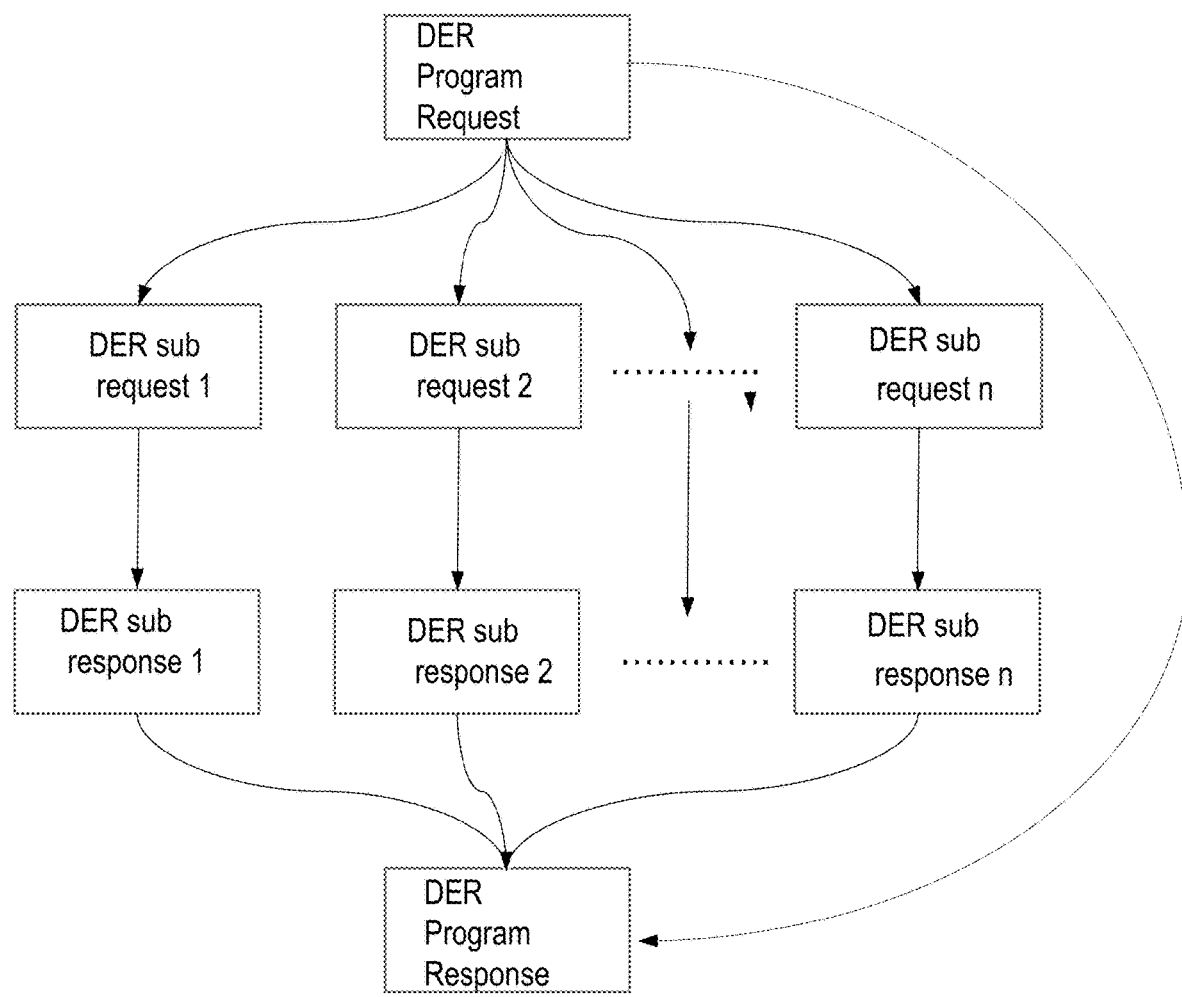
FIG. 5 is a flow diagram depicting how a program request is broken into N sub-requests.

The community administration component 150 includes a member manager 152, a reward manager 154, a program manager 156 and a security manager 158. As illustrated in FIG. 5, a manager 406 can monitor DER members using manager 152, check that rewards are well assigned using the reward manager 154, determine whether the DER program is running as expected using manager 156, and assess program security using manager 158. The reward management component 154, is responsible for collecting statistics of usage, and rewarding DER contributors based on such statistics and according to the reward policy defined for the program (i.e. money, fidelity points, grants, score, etc.). Additional components may be added over time to deal with new business requirements and new users' designs.

FIG. 4 also illustrates how end users 404 (i.e. DER contributors) interact with system 100. In general, users 404 interact with the DER evaluation and dispatching component 130 and the community builder 140. The community builder 140 includes an owner engagement component 142 an owner registration component 144, a DER registration component 145, an analytics component 146, a marketplace 148 and a data collection component 149. The users 404 may be DER contributors, which have been through the DER registration process managed by the community builder registration component 145. Users 404 may be DER technology vendors which join the DER digital marketplace 148. Internet of Things devices can exchange data and information with the system via an IoT interface 120.

As an example of the system/user interaction, a DER program manager 402 may access the system 100 and select a DER program though which a request will be submitted to the registered DER contributors via a user interface 102/104. The request is stored in the DER evaluation and dispatching component 130, taken in charge by workflow engine 430, and then analyzed and dispatched to the multitude of DER contributors. The workflow activated by this request will determine the action to be performed. In one example, a DER dispatch request for a demand/response program is created. The system, based on the data of the DER evaluation and dispatching component such as DER skill management data or priority, will determine the set of best DER contributors to participate in the demand response event and complete each sub-request. Once the contributors have been selected by the system, they are notified when to drop their DER load through the preferred or subscribed communication channel stored in their registration profile (i.e. text, email, mobile app, machine to machine, etc.). Selected contributors will then need to respond to, so they individually or through one or more processing devices may access the system in order to respond to the sub-request. If a DER contributor is able to respond, it will drop the load as required using the preferred or configured communication channel, which measured, evaluated and confirmed by the DER evaluation and dispatching component for confirmation and rewarding.

The DER program manager will receive notifications and updates on the sub-requests progress, and may access the system to monitor the demand response event status, sub-request failures, system errors, etc. According to these results, the system will update the DER program status, and the DER contributors scoring and profile, and will provide input to the DER rewarding system. Numerous other use scenarios are possible with system 100.

FIG. 5 is high-level conceptual diagram of how a program request is sub-divided and addressed by system 100. A DER program request is decomposed into several sub requests (DER sub-request 1, DER sub-request 2 . . . DER sub-request n) that can be executed in parallel, in series or in a sequence defined by a set of processing rules. The request produces a set of sub-responses (DER sub-response 1, DER sub-response 2 . . . DER sub-response n) that the system is able to aggregate in order to provide the DER program response to the initial DER program request. The example diagram of FIG. 5 represents one specific kind of request. Not every DER program request need be designed in a way to be split and sent to many contributors. Sometimes, for example, a DER program business rule could require sending requests for a specific DER contributor directly, due to location or priority constraints.

Figure 6:
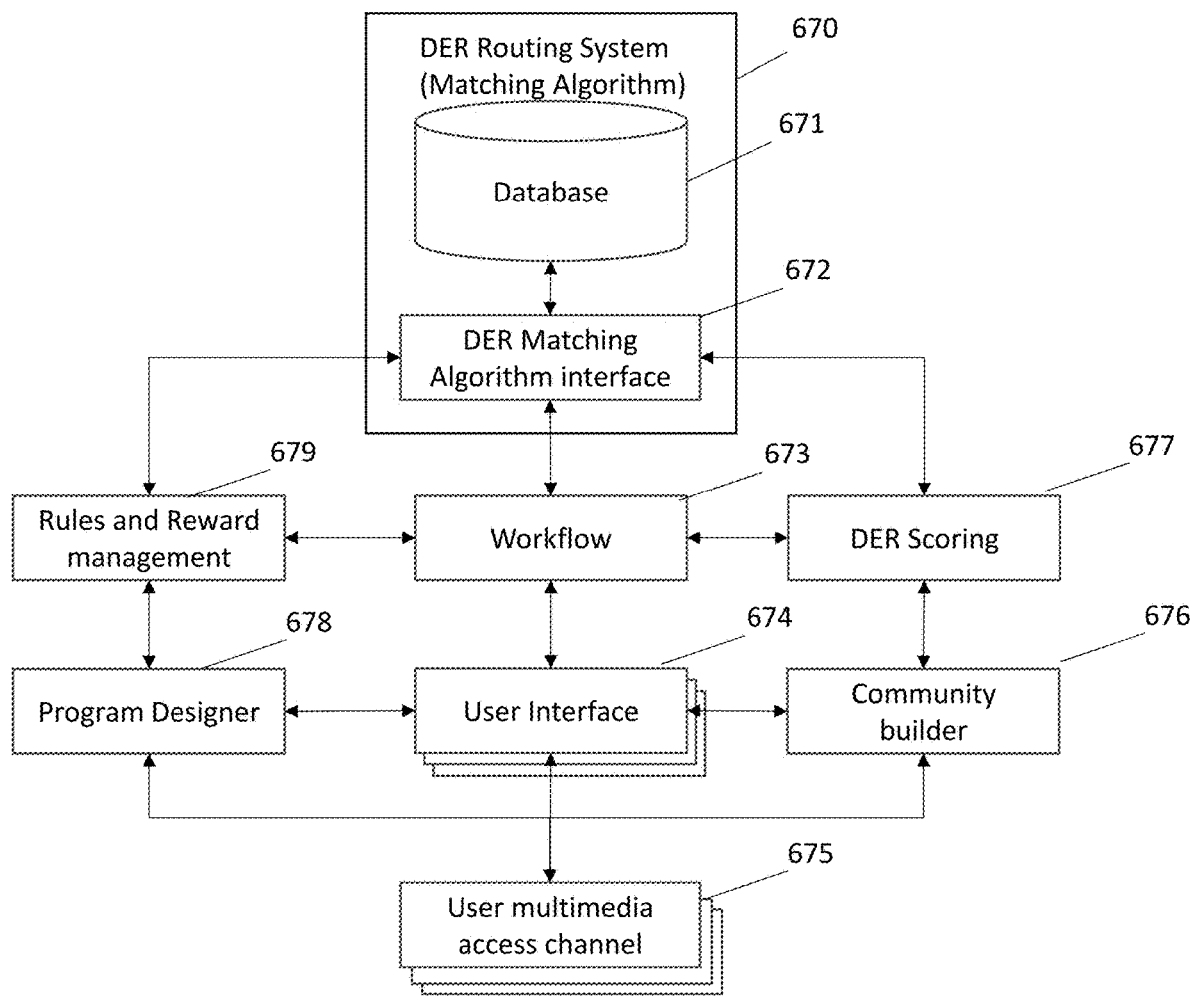
FIG. 6 is a high-level diagram of the application architecture of the present technology.

FIG. 6 shows a high-level diagram of the application architecture of the present technology. Main application modules and data flows are depicted. DER program rules and policies are stored in the DER routing system database 671, which is accessible to all other application modules through the DER routing system interface 672. Interface 672 implements a common set of objects and APIs used to easily access and manipulate data. The workflow engine 673 (equivalent to engine 430 in FIG. 4) handles all automatic operations in the system, such as state transitions, data transformations and integrity checks, actions, interrupts and notifications. The user interface module 674 handles the interactions with all users (DER program designers, DER contributors, community administrators, etc.) and manages all manual activities in the system, by interacting with the workflow engine 430, the program designer 120, and the community builder 140. Users can interact with the user interface through the user multimedia access channel module 677 that ensures accessibility through various channels (see FIG. 1B and FIG. 4). The program designer 678 allows administrators to create a DER program, setting up business rules, policy and reward management 679, executed by the workflow engine, and implements the rewarding mechanism for the contributions of DERs. The community builder 676 allows DER contributors to sign up and register their DER and participate in DER programs; the DER scoring module 677 analyzes the DER from several standpoints and defines scores and skills to be used by the workflow and exchange with the DER Matching Algorithm.

Figure 7:
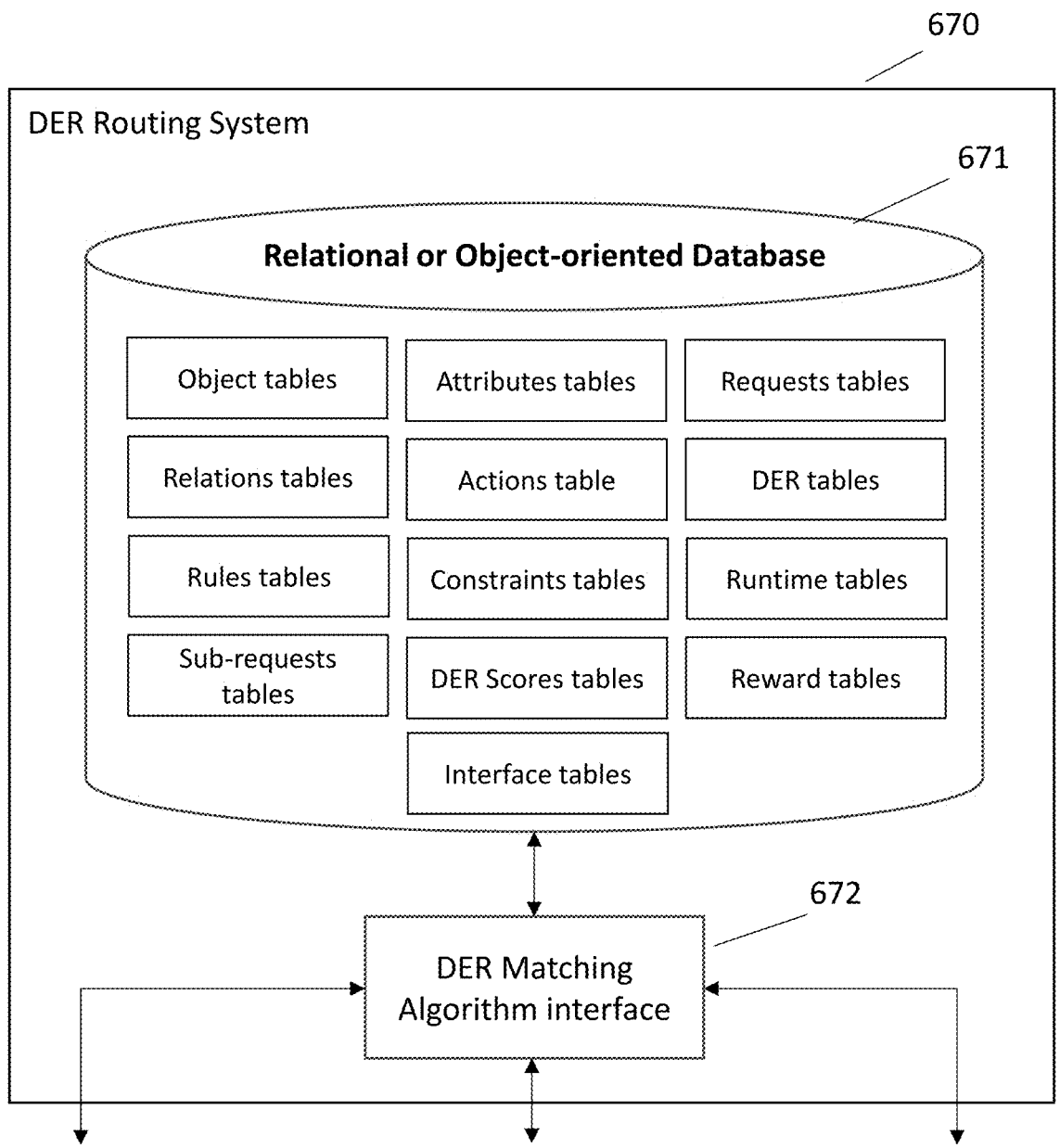
FIG. 7 shows a high-level diagram of the DER routing system object-oriented data model.

FIG. 7 shows a high-level diagram of the DER routing system object-oriented data model. (Although the system is illustrated with respect to an object oriented data model, relational database implementations can be also utilized). The data model consists of a number of tables or collections, conceptually grouped by referential consistency, where all static, meta, and dynamic data are stored. The DER Program is modeled by objects, attributes, relations, rules, constraints and DER scores tables. DER program requests are stored in request tables, while DER contributors and DER program workflows are modeled by DER tables, sub-requests, rewards, actions and runtime tables. Interface tables are included to allow intercommunication with external systems (i.e. data warehouse, billing, CRM).

Figure 8:
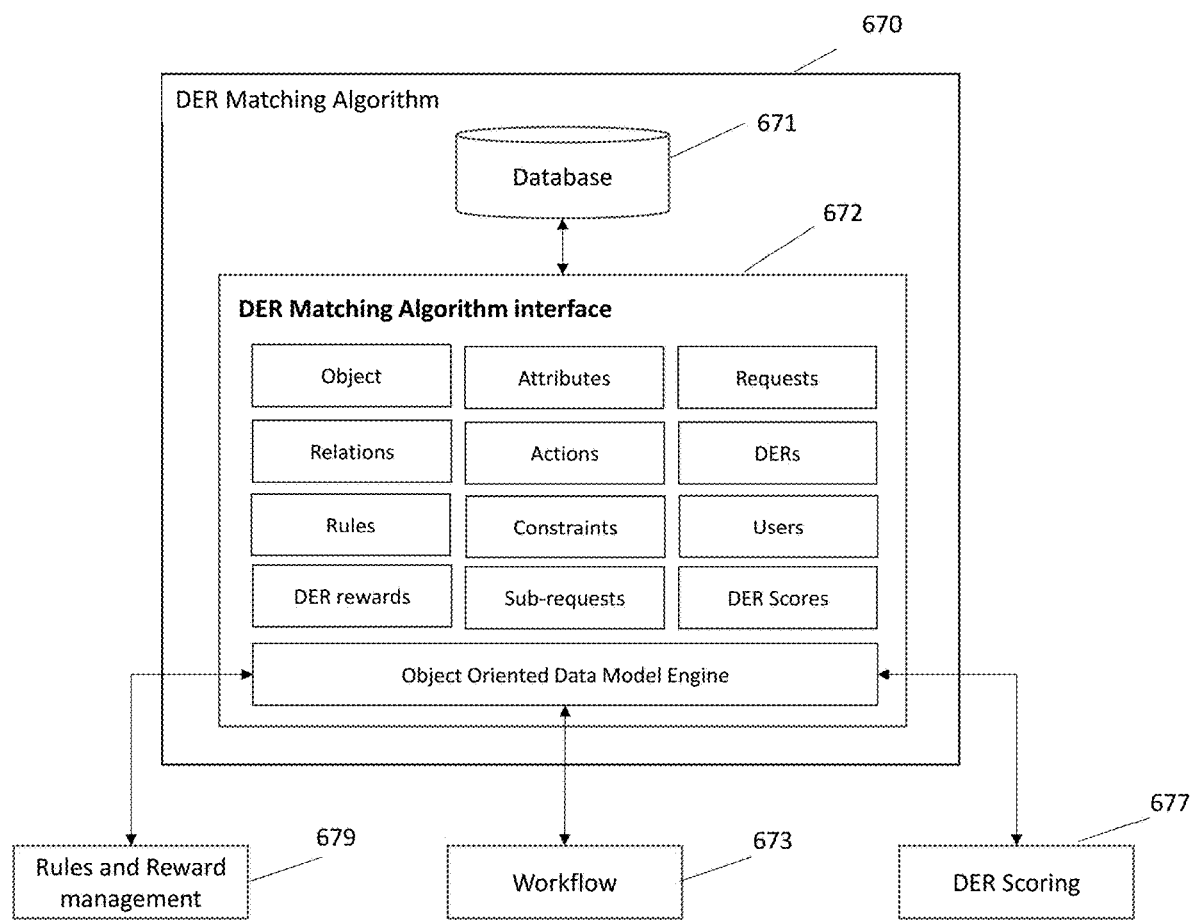
FIG. 8 is a block diagram the internal architecture of the DER routing system interface.

FIG. 8 represents the internal architecture of the DER routing system interface 672. All external modules access persistent data through this module, interacting with an Object-Oriented Data Model Engine, responsible for mapping structured data, stored in the database illustrated in FIG. 7, to object classes and APIs, reflecting the conceptual data model.

Figure 9:
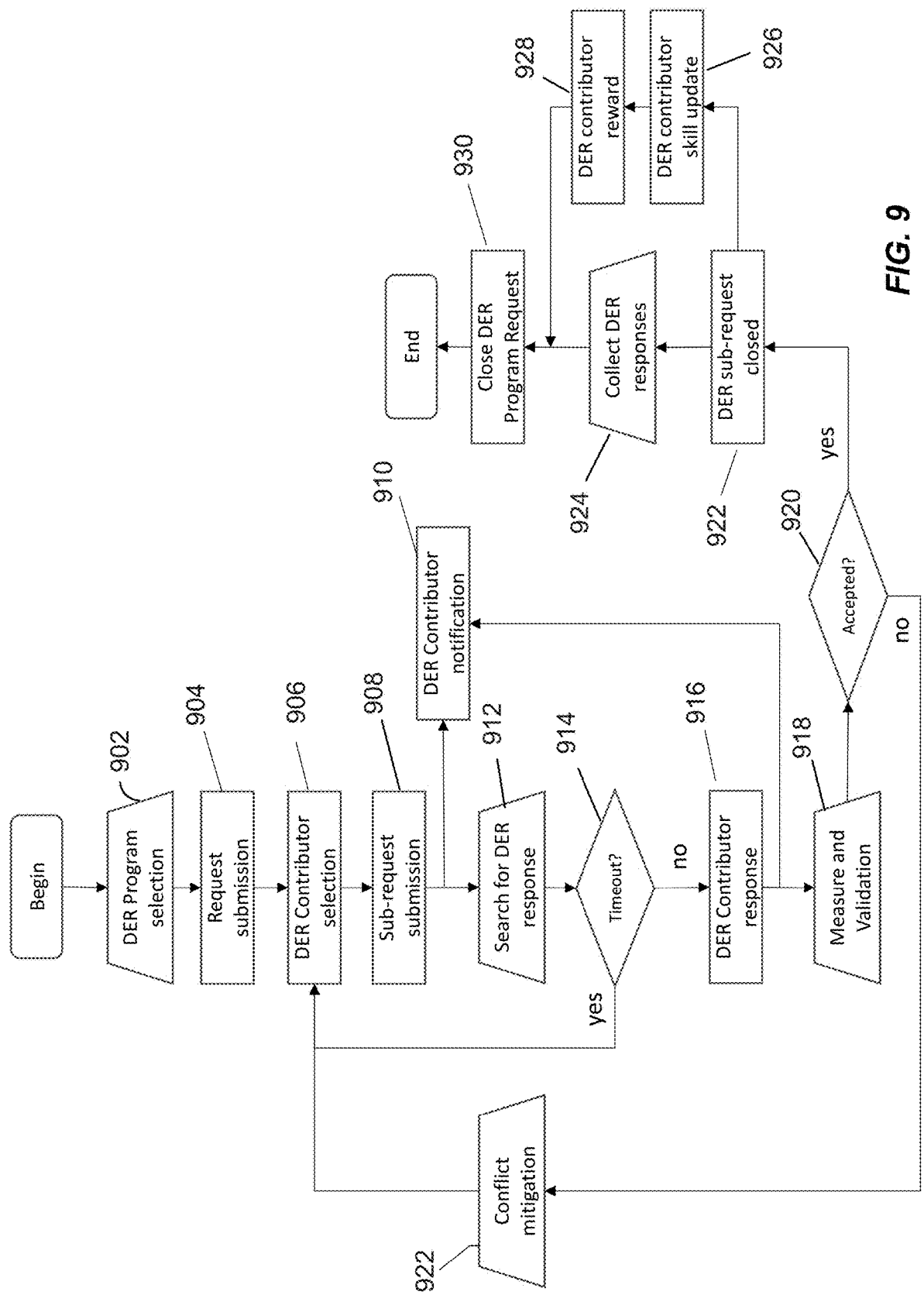
FIG. 9 shows an example flow diagram describing a DER program request lifecycle, in terms of actors, manual and automatic tasks and transitions, and states.

FIG. 9 shows an example flow diagram describing a DER program request lifecycle, in terms of actors, manual and automatic tasks and transitions, and states. At 902, a DER program manager selects a DER program from his available list, creates and submits a request to his DER community (through a user interface) at 904. At 906, the system searches for the best suitable DER contributor or set of DER contributors, and it submits one or many sub-requests to them at 908, notifying the contributor at 910. The system waits for a DER response at 912 but if the DER contributor is not able to respond to his sub-request within a defined timeframe at 914, then a new DER contributor is selected by the system by looping back to 906. If a DER contributor's response is provided at 916 within the timeout period, it is collected, measured and validated by the system at 918. At 920 if the DER contributor's response is accepted, then the sub-request is closed 922 (and archived for future use) and aggregated by the system to close the initial DER program request; DER contributor skills are updated at 926, and rewards are assigned at 928. Otherwise, if the response is not accepted at 920, else a new contributor is selected, and conflict is handled between DER program manager and DER contributor at 922. Once all DER responses are collected at 924, the program request is closed at 930.

Figure 10:
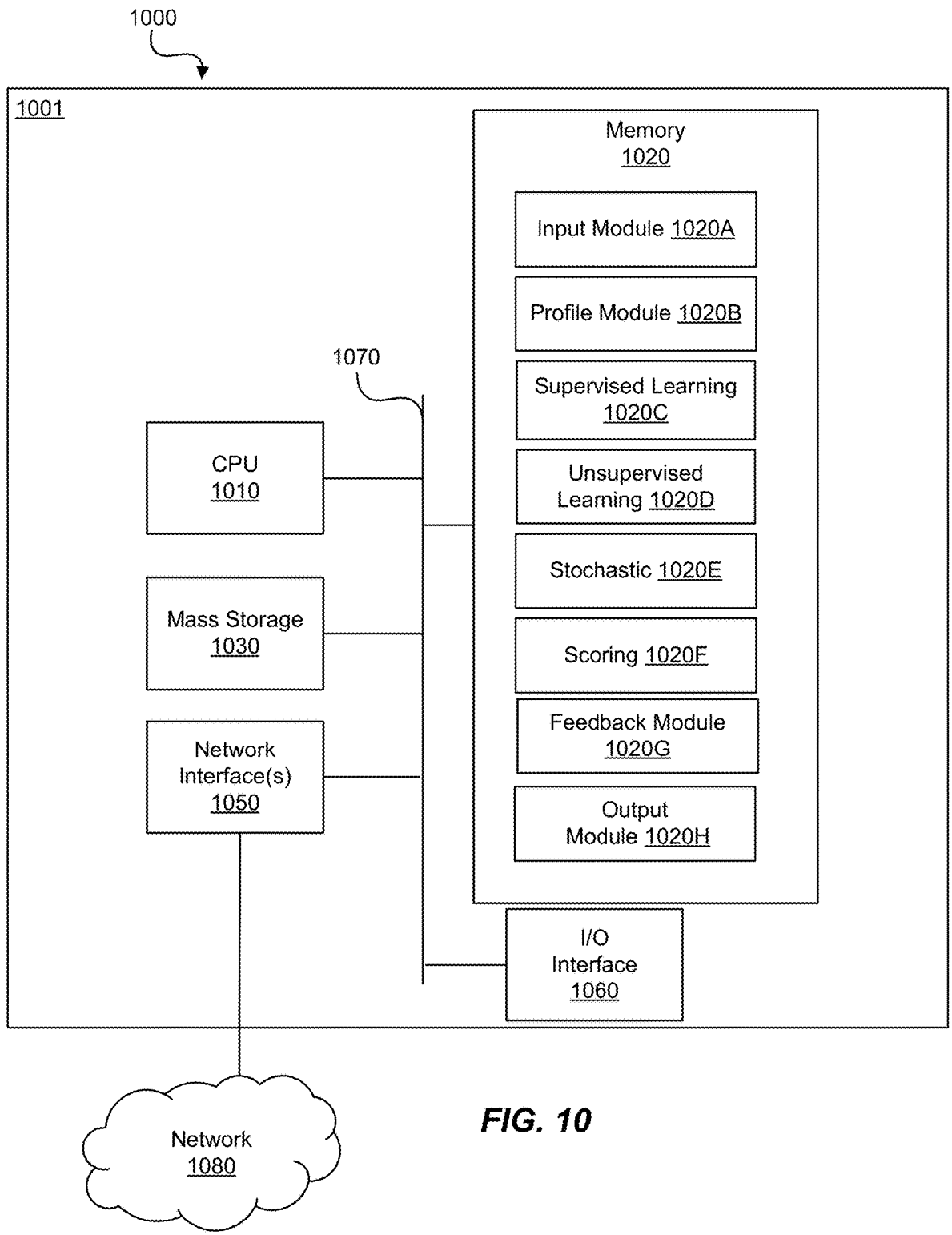
FIG. 10 is a block diagram of a network device that can be used to implement various embodiments of the present technology.

FIG. 10 is a block diagram of a network device 1000 that can be used to implement various embodiments of the present technology. Specific network devices may utilize all of the components shown, or only a subset of the components, and levels of integration may vary from device to device. Furthermore, the network device 1000 may contain multiple instances of a component, such as multiple processing units, processors, memories, transmitters, receivers, etc. The network device 1000 may include a central processing unit (CPU) 1010, a memory 1020, a mass storage device 1030, and an I/O interface 1060 connected to a bus 1070. The bus 1070 may be one or more of any type of several bus architectures including a memory bus or memory controller, a peripheral bus or the like.

The CPU 1010 may comprise any type of electronic data processor. The memory 1020 may comprise any type of system memory such as static random-access memory (SRAM), dynamic random-access memory (DRAM), synchronous DRAM (SDRAM), read-only memory (ROM), a combination thereof, or the like. In an embodiment, the memory 1020 may include ROM for use at boot-up, and DRAM for program and data storage for use while executing programs.

In embodiments, the memory 1020 is non-transitory. In one embodiment, the memory 1020 includes an input module 1020A, a profile module 1020B, a supervised learning module 1020C, an unsupervised learning module 1020D, a stochastic module 1020E, a scoring module 1020F, a feedback module 1020G and an output module 1020H. Such modules implement a routing system or "matching algorithm" as discussed herein. Any one or more of these elements may be stored as instructions on the mass storage device 1030. The instructions may be operable to control the CPU 1010 to perform the functions described above with respect to these elements. In alternative embodiments, each of the modules may be implanted in hardware, using, for example, programmable logic devices and/or systems.

The input module 1020A is configured to receive a DER program request including a set of normalized request attributes. Each request attribute includes an identifier of a particular DER skill and a normalized quantifier indicating the importance of the DER skill for providing a response to the request.

The mass storage device 1030 may comprise any type of storage device configured to store data, programs, and other information and to make the data, programs, and other information accessible via the bus 1070. The mass storage device 1030 may comprise, for example, one or more of a solid-state drive, hard disk drive, a magnetic disk drive, an optical disk drive, or the like.

The mass storage device may also store the any of the components described as being in or illustrated in memory 1020 to be read by the CPU and executed in memory 1020. The mass storage device may comprise computer-readable non-transitory media which includes all types of computer readable media, including magnetic storage media, optical storage media, and solid-state storage media and specifically excludes signals. It should be understood that the software can be installed in and sold with the network device. Alternatively the software can be obtained and loaded into network device, including obtaining the software via a disc medium or from any manner of network or distribution system, including, for example, from a server owned by the software creator or from a server not owned but used by the software creator. The software can be stored on a server for distribution over the Internet, for example.

The network device 1000 also includes one or more network interfaces 1050, which may comprise wired links, such as an Ethernet cable or the like, and/or wireless links to access nodes or one or more networks 1080. The network interface 1050 allows the network device 1000 to communicate with remote units via the networks 1080. For example, the network interface 1050 may provide wireless communication via one or more transmitters/transmit antennas and one or more receivers/receive antennas. In an embodiment, the network device 1000 is coupled to a local-area network or a wide-area network 1080 for data processing and communications with remote devices, such as other processing units, the Internet, remote storage facilities, or the like.

Figure 11:
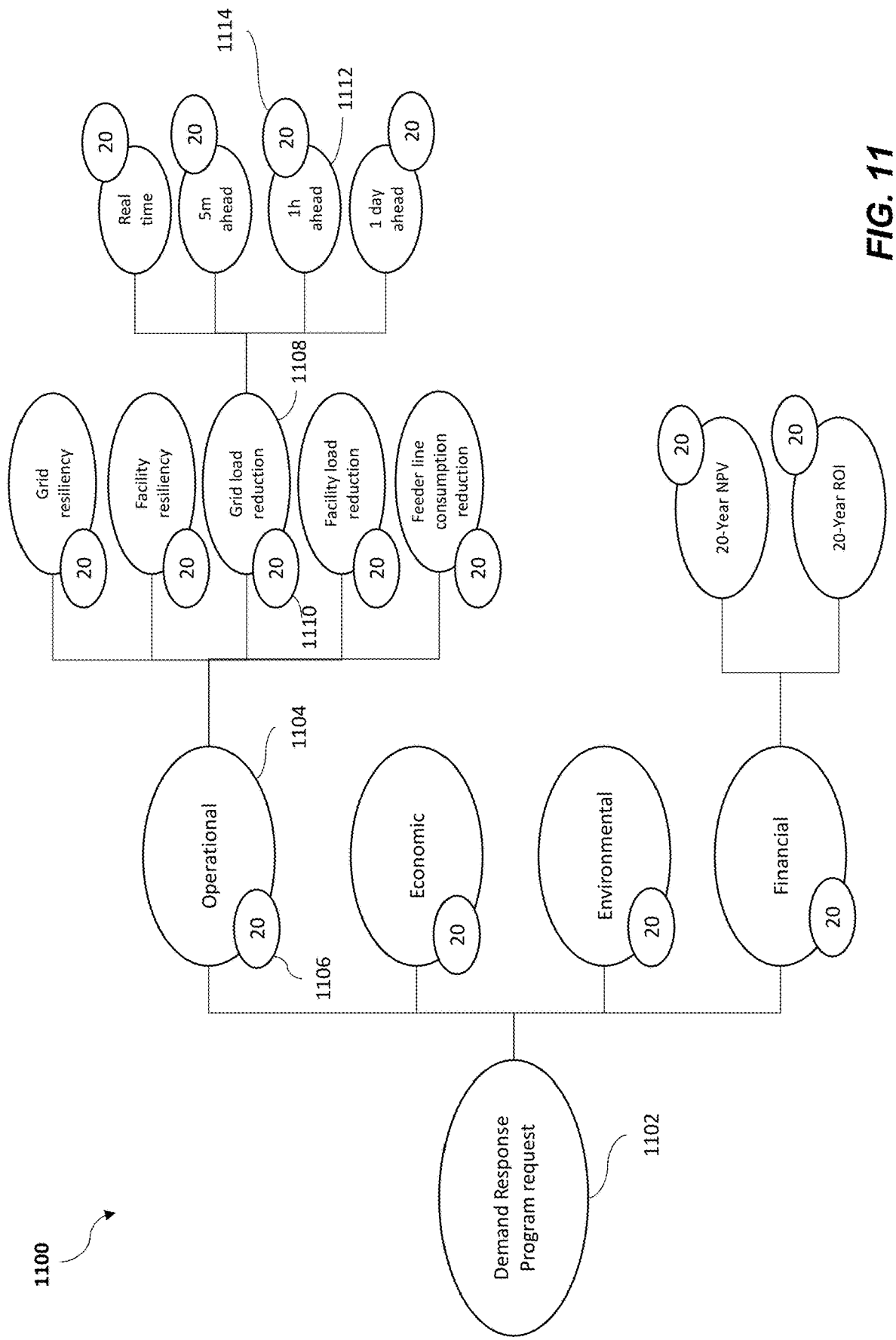
FIG. 11 depicts an exemplary request attribute tree according to various embodiments.

As used herein, a request may be specified by a program administrator, utility manager or other entity by submitting, via a user interface, one or more service requests to the DER contributors of the program. Each request may have one or more request attributes, as illustrated in FIG. 11. Each request may take the form of a XML or JSON structured object which may be parsed by the system, though the particular format used by the system may vary. Although a request may be generated come from a user interacting with the system via the UI, in other embodiments, the requests may be received by external systems communicating with system 100.

Referring now to FIG. 11, an exemplary request attribute tree 1100 according to various embodiments is depicted. The request attribute tree 1100 is an organization of the request attributes and corresponds to the various scoring skills of the available distributed energy resources, for example, DER contributors. In this instance, the request is a demand response program request 1102 for a distribution system operator. The DER program manager, i.e., DER Program Manager 402, initiating the DER program request may identify the request as an 'Operational' request 1104. Other types of requests may be classified as Economic, Environmental or Financial. Each type of request may have its own set of attributes, not all of which are illustrated in FIG. 11 The 'Operational' request 1104 is assigned with an intermediate value 1106 of twenty. If the DER program manager cannot further define the request, the intermediate value is assigned to all the leaves (grid resiliency, facility resiliency, grid load reduction, facility load reduction, feeder line consumption reduction) depending from the 'Operational' request 1104. In this example, the DER program manager has specified that the 'Operational' request 1104 is a 'Grid Load reduction' 1108 having an intermediate value 1110 of twenty. In this example, the request is further identified as a '1h ahead' request 1112. Within the request attribute tree 1100, the '1h ahead' request is associated with a DER skill value 1114 of twenty. The DER skill value 1114 may be based on a DER program template used to define the request, be specified by the DER program manager, or be based on industry standard criteria, for example.

As is apparent to those skilled in the art, the intermediate values 1106 and 1110 may have a value other than twenty. Further, the skill value 1114 may be a different value. Further, the task attribute tree 1100 is shown for the purposes of illustration only. As will be apparent to those skilled in the art, other data structures can be used to assign DER program request attributes. The request attribute values, once determined, are normalized according to known normalization techniques.

Referring back to FIG. 10, the profile module 1020B is configured to access profiles of DER contributors. For each DER contributor, a profile includes a plurality of scoring metrics and a plurality of performance indicators. In some embodiments, the profile also includes DER metadata information about the owner such as preferences, location, type, nameplate capacity, or the like. The scoring metrics correspond to the particular skills defined by the request attributes and indicate the DER contributor's ability level for each particular DER program request type. The skill metrics are determined based on the DER scoring module 206. The data in the profile may be imported from another system or platform. In some embodiments, the DER scoring metrics are also based on whether a previous request sent by the DER program manager was accepted and responded.

Referring back to FIG. 10, the DER scoring module 1020F is configured to continuously process DER contributor's data and metadata, evaluate, generate and update scoring metrics for each DER contributor's profile. The scoring module generates or updates these scoring metrics for each DER contributor based on its set of skills assigned to each at the DER Program Design step. As such, the module performs a variety of types of score calculations at each iteration and is designed to be extendable and flexible to allow other skills and scores to be added in the future. For example, a DER planning request may require the scoring of a set of simulated DER profiles according to operational, financial, economic, and/or environment attributes. Such calculations would require the use of simulated load profiles, estimated financial projections, and industry standard metrics to derive a set of DER contributors to deploy. For example, one of the scores may be the DER Contributor's ability to aid in local grid resilience. The equations to calculate this resilience is DER type-specific and are as follows:

$$\text{Battery Grid Resilience} = B_{time} \times \frac{PB}{FLD}$$

$$\text{PV Grid Resilience} = PV_{time} \times \frac{(PPV_{remain} - FRF \times D)}{FLD}$$

where $B_{time}$=Available battery discharge time, the average amount of time a battery will be able to discharge at full capacity. The battery discharge time is calculated by determining how long each battery will discharge from its current state of charge to a minimum considering the battery power capacity (kW) and energy capacity (kWh).

PB=Battery Power Available, represents the power of a Battery Energy Storage system. It is equal to the battery's power capacity in kW.

FLD=Feeder line demand, represents the feeder line load in kW.

D=Average facility demand, represents the average facility load in kW.

FRF=Facility resilience factor represents the percentage of the DER contributor's owner's desired amount of personal resiliency from their DER.

$PPV_{remain}$=Average PV power output for the remainder of the day's generation, represents the average PV power output for the duration of its daytime production $PV_{time}$=Average PV generation duration: represents the average duration after a disturbance that a PV system will be generating.

On the other hand, a DER operational request to lower grid consumption by x % may require instantaneous metrics corresponding to real time demand, real time production, real timeline segment impact, pricing signals, etc. The scoring module 1120F will use the following equations, which again are DER type-specific, to calculate the DER contributor's potential to participate in such an event:

If DER potential power output is less than average facility demand:

$$\text{Potential Load Reduction} = \frac{PB + PPV_{daytime\ avg}}{D}$$

Additionally, the potential peak load reduction benefits can be evaluated:

$$\text{Peak Load Reduction} = \frac{PB + PPV_{peak}}{D_{peak}}$$

These equations are used to quantify a DER contributor's ability to cover a facility's load and therefore shed some grid load to serve the event.

Such examples show the diversity of the scoring module and its requirement to be flexible and extendable. In general, however, the scoring criteria are divided into categories that pertain to relevant energy stakeholders' objectives: operations (grid impact and DER optimization), finance, environment, and economics.

Figure 12:
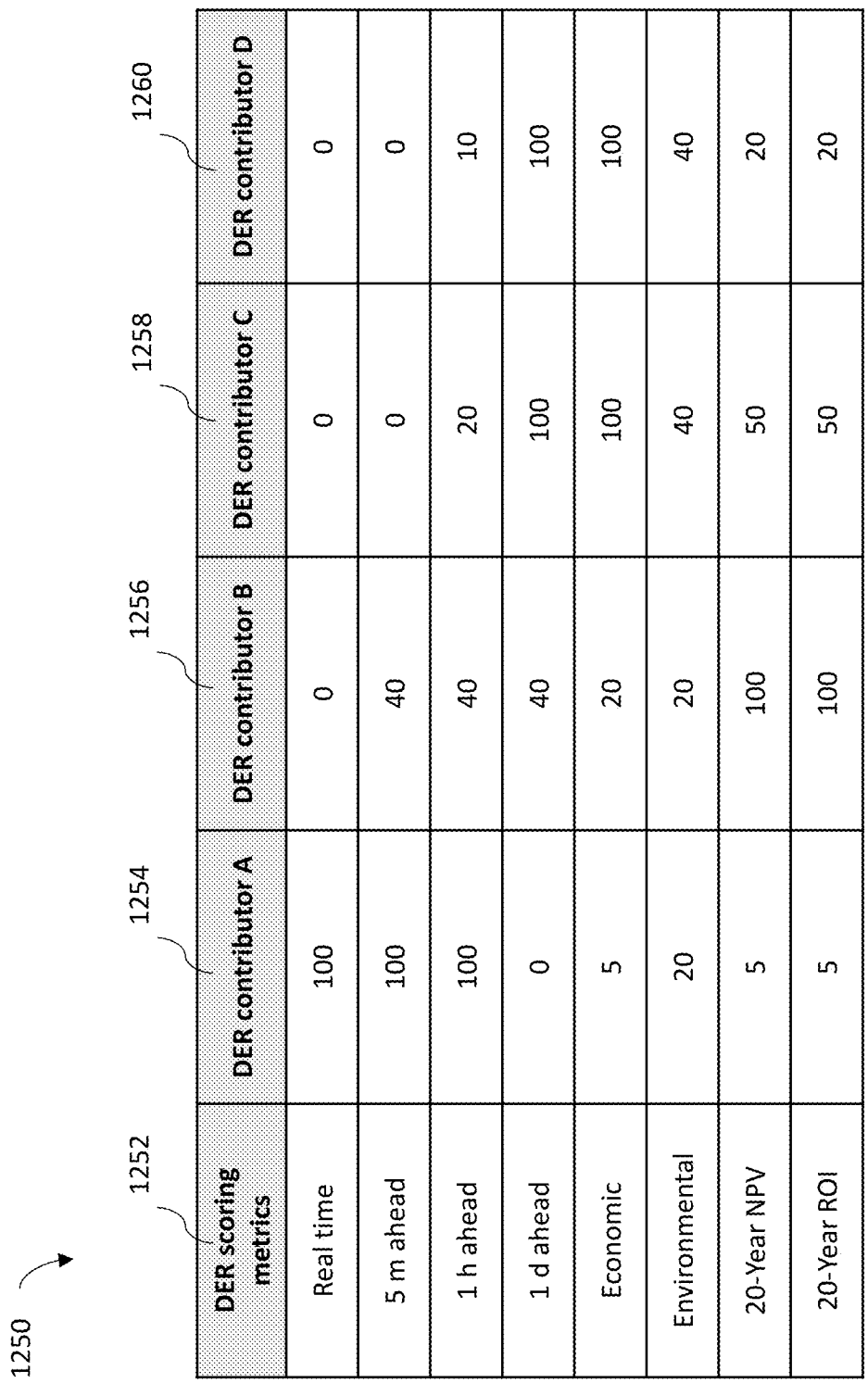
FIG. 12 depicts a table of the scoring metrics of DER contributors according to various embodiments.

Referring now to FIG. 12, a table 1250 depicting the scoring metrics of DER contributors according to various embodiments is shown. The table 1250 includes DER scoring metrics 1252 which correspond to the DER program request attributes of the request attribute tree 1200. For the purposes of illustration, the table 1250 includes the scoring metrics for each request attribute of DER contributor A 1254, DER contributor B 1256, DER contributor C 1258, and DER contributor D 1260.

The performance indicators within the profile module 1020B include behavioral factors of a DER contributor. Typically, the performance indicators are cumulatively calculated as a DER contributor is allocated requests and provides responses to those requests. To illustrate, one performance indicator is "reliability" which is measured by dividing the number of requests that the DER contributor has responded to by the number of requests that the DER contributor has been allocated. Another example is "commitment" which is measured by dividing the number of requests that the DER contributor has accepted from the routing system by the number of requests that the DER contributor has been allocated. Further performance indicators may be measured based on, for example, an amount of time to accept an allocated request or an amount of time to provide a response to the allocated request.

Referring back to FIG. 10, the supervised learning module 1020C is configured to calculate at least one initial value for each DER profile based on the at least one normalized request attribute and the plurality of DER scoring metrics. For each request attribute associated with the request, an initial value is generated based on the value of a corresponding scoring metric within the profile of the DER contributor. The initial value may be zero for a request attribute if the DER contributor has a scoring metric having a zero value or if the DER program manager indicated that request attribute is not relevant to the current request.

The unsupervised learning module 1020D is configured to calculate a fitness metric for each DER profile based on the initial values. The unsupervised learning module 1020D uses a neural network for each DER profile. The initial values for each DER profile are input into the unsupervised learning module 1020D. The unsupervised learning module 1020D uses a neural network that includes weighting factors that are based on the plurality of performance indicators within the DER profile. Neural networks are generally known to those skilled in the art.

Figure 13:
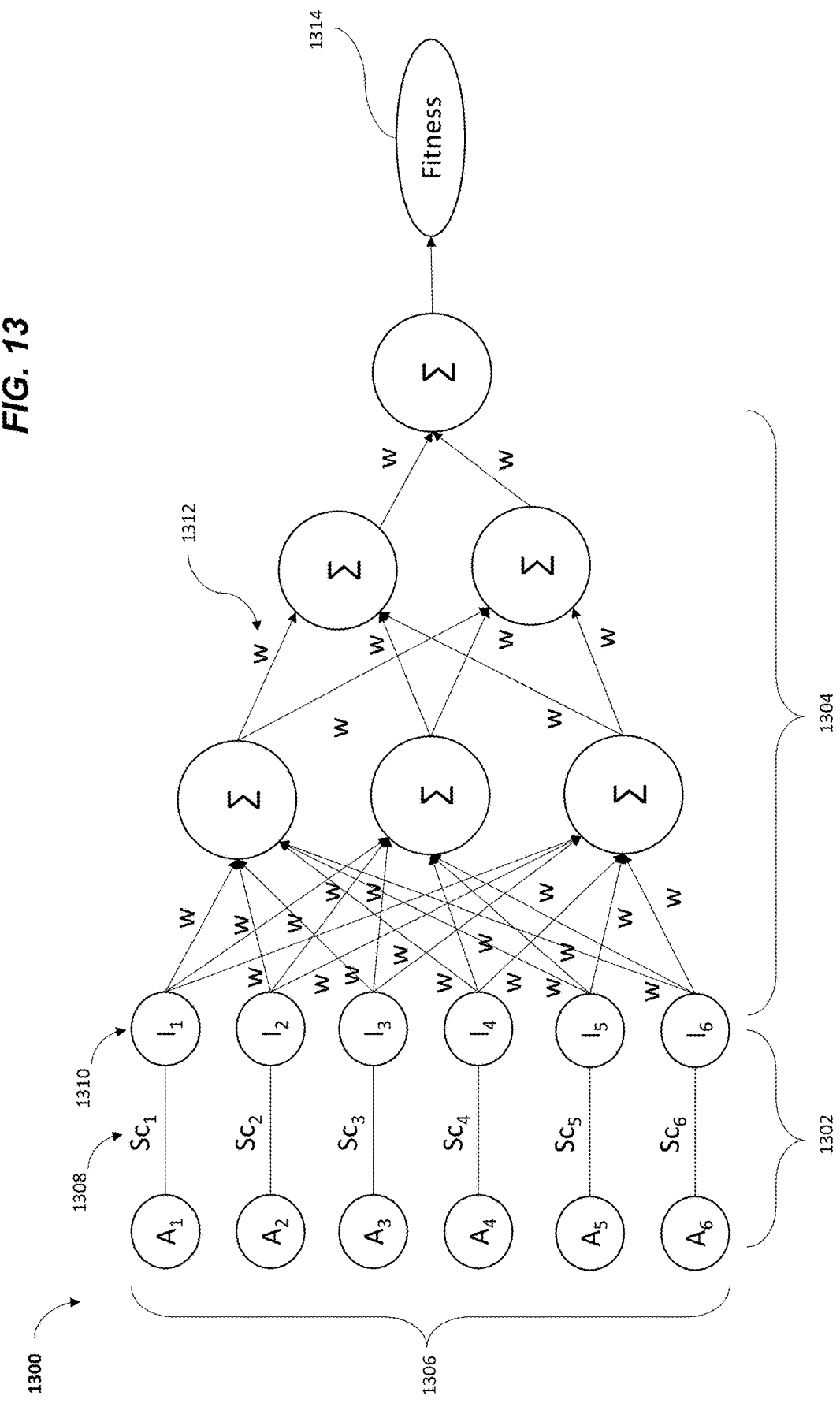
FIG. 13 is a diagram of an exemplary neural network according to various embodiments is shown.

Referring now to FIG. 13, a diagram of an exemplary neural network 1300 according to various embodiments is shown. The neural network 1300 includes a supervised learning portion 1302 and an unsupervised learning portion 1304.

The supervised learning portion 1302 includes normalized DER program request attributes An 1306 and score metrics Scn 1308 both as described in connection with FIG. 11. The supervised learning portion 1302 calculates initial values 1310 according to the formula:

$$I_n = A_n * Sc_n$$

While the calculation of the initial values is shown as part of the neural network, it will be apparent that other techniques may be used. The supervised learning portion 1302 is implemented by the supervised learning module 208.

The unsupervised learning portion 1304, implemented by the unsupervised learning module 1020D, includes a neural network having weights wm 1312 between nodes. The unsupervised learning portion 1304 receives the initial values 1310 and calculates a fitness metric 1314. The value at each secondary node of the unsupervised learning portion 1304 is:

$$\Sigma = \Sigma(I_N * w_m)$$

As is apparent to those skilled in neural networks, at each successive node, the value is calculated in similar fashion. It should be noted that each weight 1312 may be different from the other weights. From the unsupervised learning portion 1304, the fitness metric 1314 associated with the DER contributor's profile on which the neural network is based is outputted.

Figure 14A:
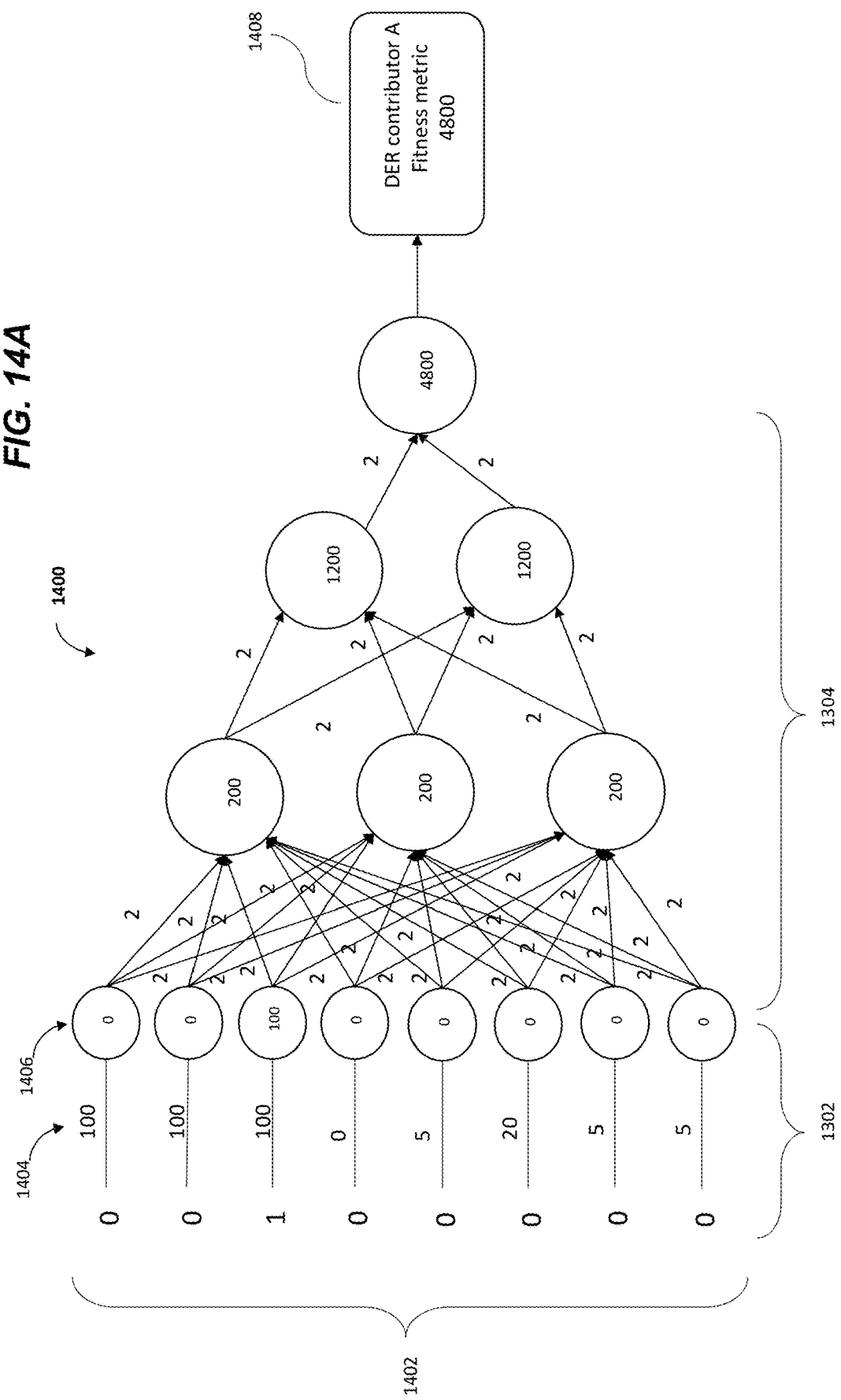
FIG. 14A is a depiction of a neural network associated with a first DER contributor according to various embodiments.

Returning to the demand response program '1h ahead' request 1112 example, FIG. 14A depicts a neural network 1400 associated with the DER contributor A 1254 of FIG. 12 according to various embodiments. In the neural network 1400, the normalized request attributes 1402 for the demand response event as described in connection with FIG. 11 are input into the supervised learning portion 1302. The scoring metrics 1404 of DER contributor A 354 as described in connection with FIG. 11 are also included in the supervised learning portion of the neural network 1400. The initial values 1406 are calculated as discussed in connection with FIG. 13. Based on the initial values, an unsupervised learning portion 1304 of the neural network 1400 calculates a fitness metric 1408 of 4800 for the DER contributor A 354. The weights in the neural network 1400 are all depicted as the value two; however, as will be apparent to one skilled in the art, the weights may vary.

FIG. 14B is a depiction of a neural network 1430 associated with the DER contributor B 356 of FIG. 13 according to various embodiments. The neural network 1430 receives the same task attributes 1402 as the neural network 1400. The supervised learning portion 1302 of the neural network 1430, however, includes the scoring metrics 1432 of DER contributor B 356. Based on the initial values 1434 calculated by the neural network 1430, the unsupervised learning portion 1304 of the neural network 1430 calculates a fitness metric 1436 of 1920 for the DER contributor B 356.

Figure 14C:
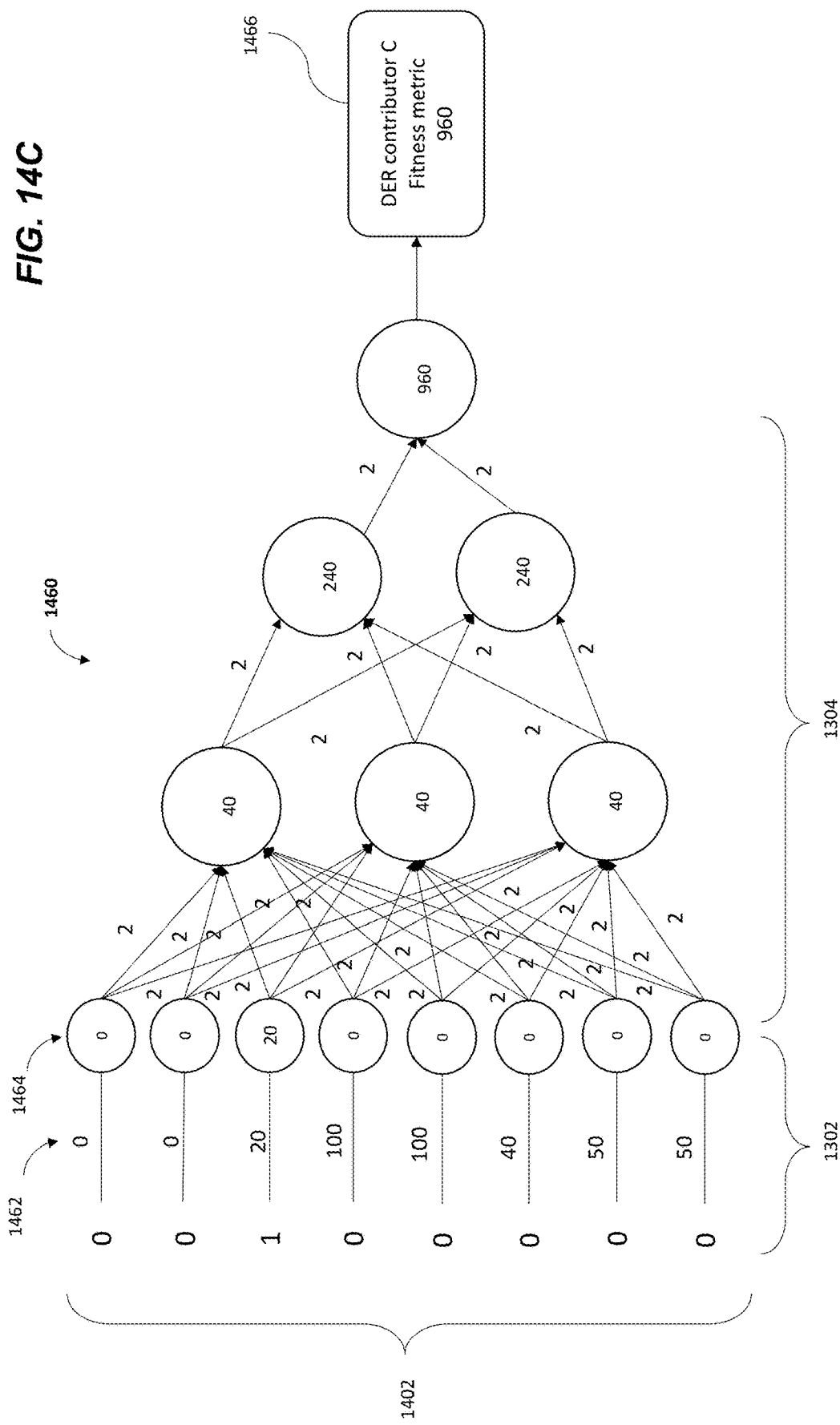
FIG. 14C is a depiction of a neural network associated with a third DER contributor according to various embodiments.

FIG. 14C is a depiction of a neural network 1460 associated with the DER contributor C 358 of FIG. 13 according to various embodiments. The neural network 1460 receives the same task attributes 1402 as the neural network 1400. The supervised learning portion 1302 of the neural network 1460, however, includes the scoring metrics 1462 of DER contributor C 358. Based on the initial values 1464 calculated by the neural network 1460, the unsupervised learning portion 1304 of the neural network 1460 calculates a fitness value 1466 of 960 for the DER contributor C 358.

Figure 14D:
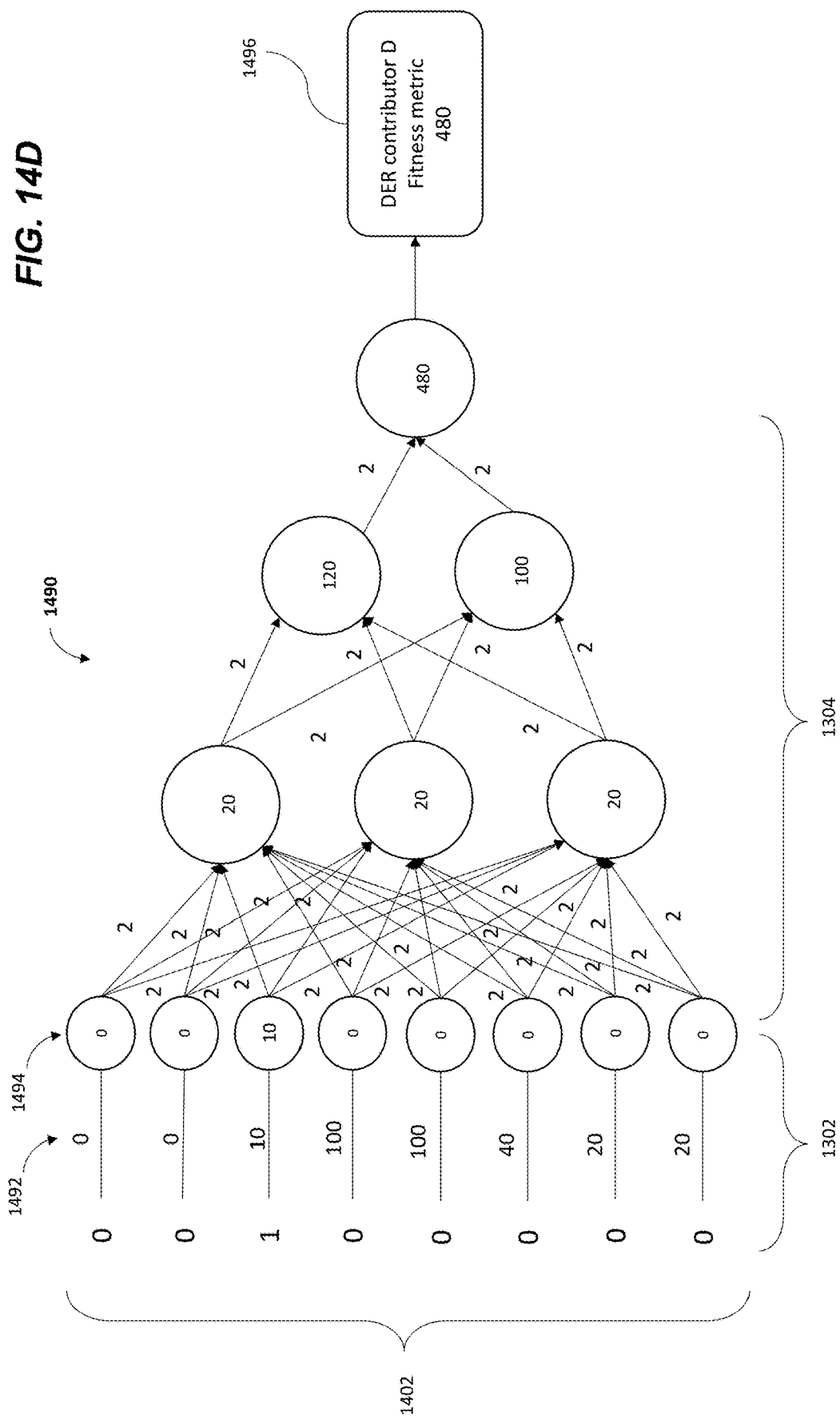
FIG. 14D is a depiction of a neural network associated with a fourth DER contributor according to various embodiments.

FIG. 14D is a depiction of a neural network 1490 associated with the DER contributor D 360 of FIG. 13 according to various embodiments. The neural network 1490 receives the same task attributes 1402 as the neural network 1400. The supervised learning portion 1302 of the neural network 1490, however, includes the skill metrics 1492 of DER contributor D 360. Based on the initial values 1494 calculated by the neural network 1490, the unsupervised learning portion 1304 of the neural network 1490 calculates a fitness metric 1496 of 480 for the DER contributor D 360.

Returning to FIG. 10, the stochastic module 1020E receives the fitness metrics calculated by the unsupervised learning module 1020D. The stochastic module 1020E is configured to select a DER contributor's profile or a set of DER contributor's profiles by implementing a stochastic model using the fitness metric. Because neural networks are designed to select a single best pathway based on feedback, a neural network by itself consistently routes similar requests to the same DER contributor. To avoid allocating too many requests to a single DER contributor and so minimizing program response failure risk, the stochastic module 1020E is included in the routing system 870. The stochastic module 1020E randomly selects profiles associated with a fitness metric in order to distribute program requests among DER contributors who would not otherwise be selected because another DER contributor has a higher fitness metric for a specific request.

Figure 15:
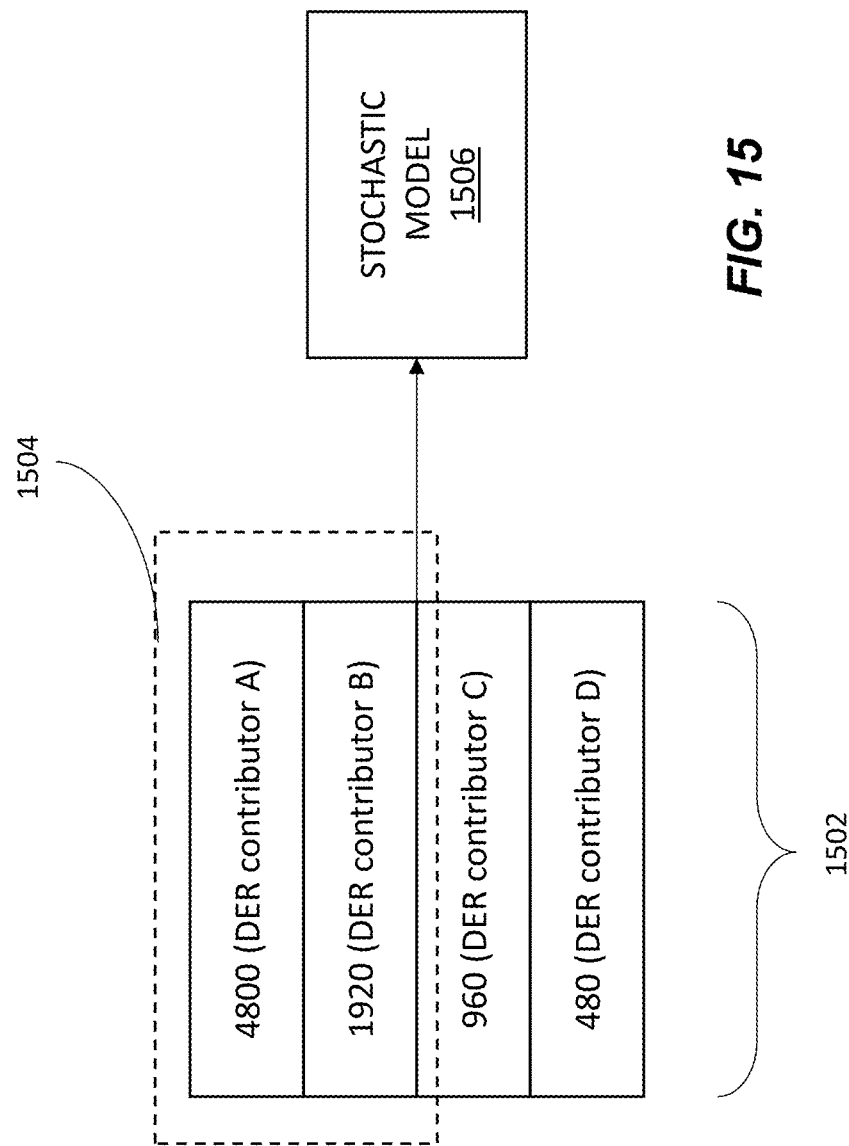
FIG. 15 is a depiction of a selection of a DER contributor according to various embodiments.

FIG. 15 is a depiction of a selection of a DER contributor according to various embodiments. In some embodiments, a list of the DER profile is sorted according to fitness value. To continue the demand response program '1h ahead' request 312 example, the table 1502 includes a sorted list of the fitness metric 508 of DER contributor A 354 from neural network 500 as described in FIG. 5A, the fitness metric 536 of DER contributor B 356 from neural network 1430 as described in FIG. 5B, the fitness metric 1466 of DER contributor C 358 from neural network 1460 as described in FIG. 14C, and the fitness metric 1496 of DER contributor D 360 from neural network 590 as described in FIG. 5D.

In some embodiments, a portion 1504 of the profiles may be pre-selected based on a threshold fitness metric, including but not limited to, for example, a percentile threshold, or the like. For example, the portion 1504 is based on a percentile threshold which pre-selects the profiles having a fitness metric within a top 50% percentile of the fitness metrics.

The stochastic model 1506, implemented by the stochastic module 1020E, may select a DER profile based on a Gaussian distribution, a lottery, or the like. In embodiments where the selection is based on a lottery, each DER profile is assigned a range of numbers according to a probability of being selected based on the fitness metric. A random number is generated. The DER profile that is assigned to a range that includes the random number is selected for the program request.

Returning to the above demand response program '1h ahead' request 1112 example, DER contributor A 354 and DER contributor 1456 may be pre-selected because both are associated with a fitness metric in the top fiftieth percentile. By normalizing the fitness metrics of both profiles, the profile of DER contributor A 354 has a 71% chance of being selected and the profile of DER contributor B 356 has a 29% chance of being selected. Based on these probabilities, the profile of DER contributor A 354 is assigned a range of numbers from zero to 0.71 and the profile of DER contributor B 356 is assigned a range of numbers from 0.72 to 1.00. A random number is generated. If the random number is 0.89, the task is allocated to the profile of DER contributor B 356 even though DER contributor B 356 has a lower fitness metric than DER contributor A 354.

The output module 1020H is configured to route the request to the DER contributor or the set of DER contributors associated with the selected profiles. The feedback module 1020G is configured to collect feedback from at least two sources. The first source of feedback is based on the behavior of the DER contributor in responding to the request. For example, data may be collected based on whether the DER contributor accepts the request, an elapsed amount of time for the selected DER contributor to accept the request, whether the DER contributor provided a response to the request, an elapsed amount of time for the DER contributor to provide a response to the request, a number of times that the DER contributor has responded a previous request, whether the selected DER contributor has accepted a request within a time-out period, whether the selected DER contributor has provided a response to the request within a time-out period, or the like. The second source of feedback is the DER program manager who submitted the request. This feedback includes collecting, measuring, analyzing and validating response data from the DER contributor. Additionally, the output module handles the mapping of the selected DER profiles to actionable requests for each DER contributor to take. For example, if DER contributor B from the previous example is chosen to respond to the '1h head' request, the output module must map this selection to a set of capacity and duration values for the contributor to perform. In this example, the output module may determine that DER contributor B must reduce 10 kW of load for 4 hours of duration.

The feedback module 1020G is configured to update the profile of the DER contributor in the DER scoring module 206 based on the feedback. For example, if the response is validated and accepted, the scoring metrics associated with the request attributes may be increased or weights within the neural network may be modified as is discussed in connection with FIG. 16. The feedback based on the behavior of the DER contributor may be used to update weights within the neural network according to a learning function.

Figure 16:
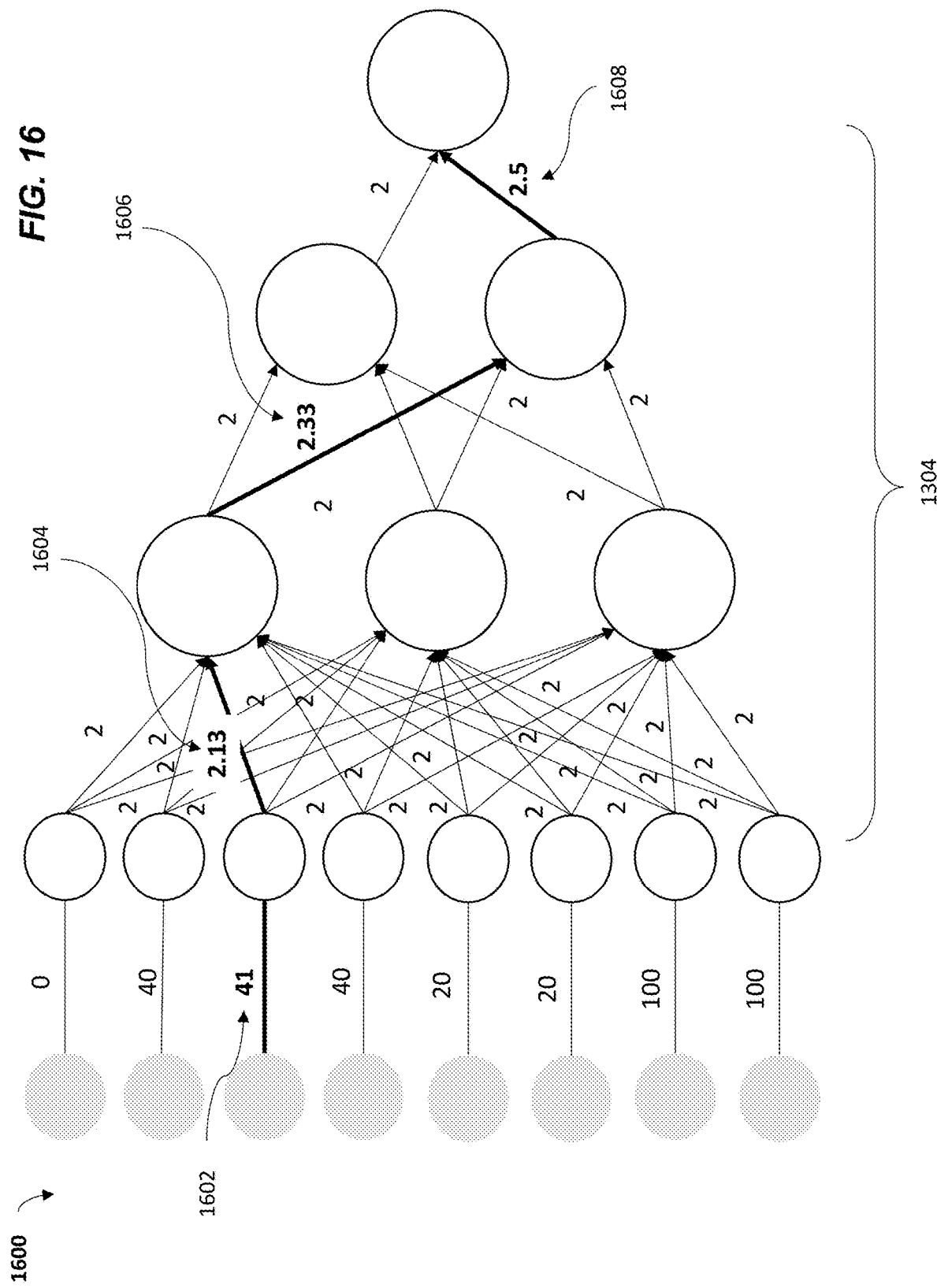
FIG. 16 is a depiction of an updated neural network associated with the second DER contributor according to various embodiments.

Referring to FIG. 16, an updated neural network 1600 associated with the DER contributor B 356 according to various embodiments is depicted. To continue the demand response program '1h ahead' request 1112 example, if the response provided by DER contributor B 356 is accepted, the scoring metric 1602 associated with the '1h ahead' skill is increased from the value forty to the value forty-one. The scoring metric may be modified by incrementing the previous score level by a predefined amount for each response provided by the DER contributor that is validated and accepted. Other methods of updating the score metric will be apparent to those skilled in the art.

The unsupervised portion 1304 is updated by modifying the weights and/or the topology of the neural network 1600 according to known methods. In one embodiment, the weights in the neural network 1600 are generated according to a learning function such as:

$$w_{m(new)} = w_m + s/n$$

where wm(new) is the updated weight between the designated nodes, wm is the previous weight between the designated nodes, s is +1 if the response was validated and accepted and −1 if the response was rejected, and n is the incoming connections on the node. Using this equation, new weights 1604, 1606, and 1608 are calculated along one possible path through the neural network. In this example, because each possible path in the neural network 530 of FIG. 5B has equal weights, the selection of the weights that are modified is random. In some embodiments, only the most heavily weighted path is updated.

The routing system as described in connection with FIGS. 10-17 therefore allows DER program requests to be allocated to DER contributors based on known information stored as score metrics and behavioral information stored as performance indicators. As each DER contributor is allocated requests and provides responses to those requests, the neural networks become more refined and are more able to accurately measure fitness values associated with each DER contributor. Further, the stochastic model allows for distribution of the requests to DER contributors who may be able to provide a response to the request but would not have been chosen by merely comparing fitness metrics calculated by the neural networks.

Figure 17:
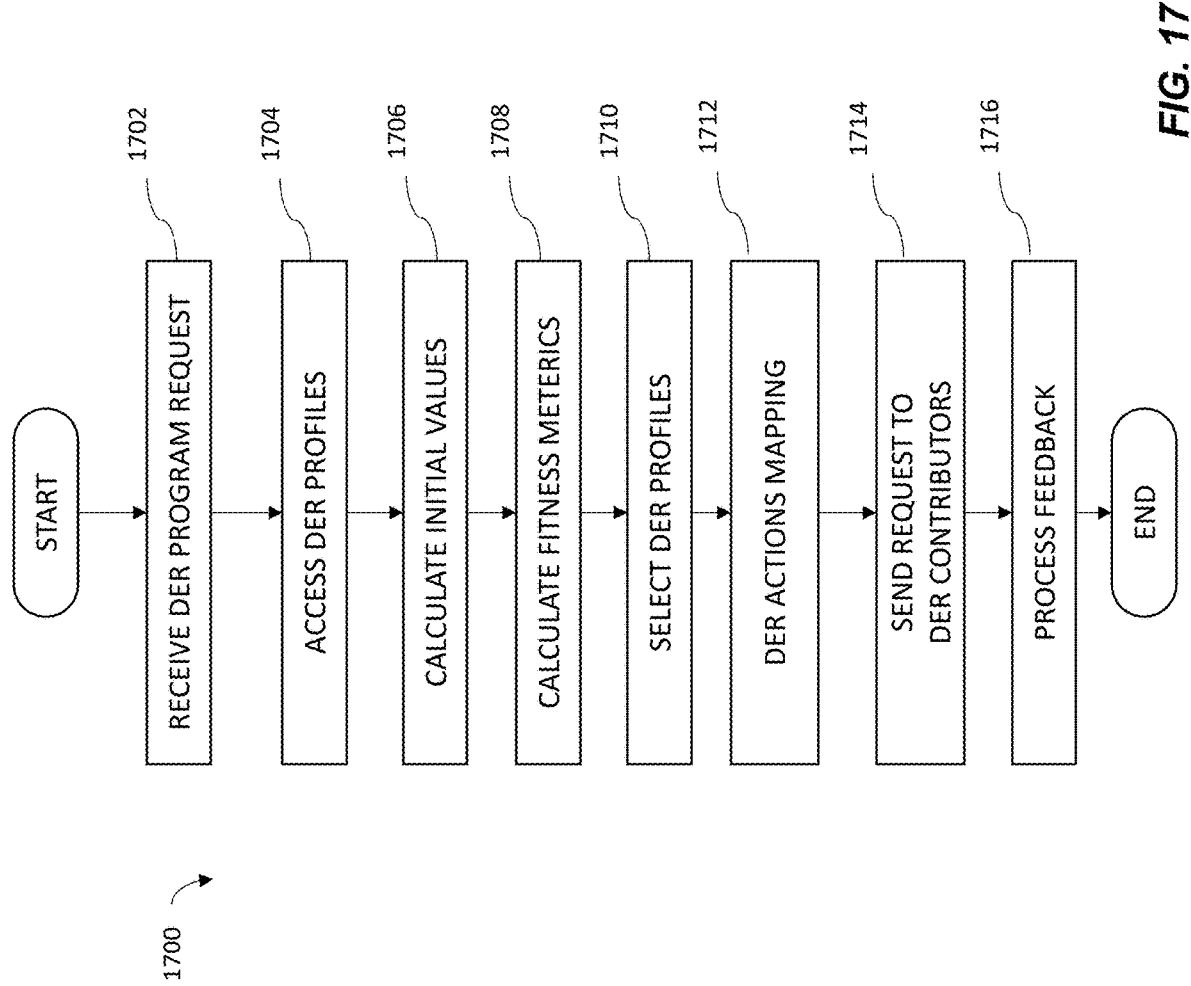
FIG. 17 is a flowchart of a method for routing and allocating a request to a DER contributor according to various embodiments.

FIG. 17 is a flowchart of a method 1700 for allocating a request to a DER contributor according to various embodiments. The method 1700 may be performed by the routing system 104.

In step 1702, a DER program request is received. The request includes at least one normalized score attribute. The step 1702 may be performed by the input module 202.

In step 1704, DER contributor profiles are accessed. Each profile is associated with a DER contributor and includes score metrics and performance indicators. The step 1704 may be performed by the profile module 204 integrating with the DER scoring module 206.

Initial values for each DER profile are calculated in step 1706. The initial values may be calculated by the supervised learning module 208.

A fitness metric for each DER profile is calculated in step 1708. The step 1708 may be performed by the unsupervised learning module 210.

In step 1710, a DER profile or a set of DER profiles are selected by, for example, the stochastic module 1020E.

In step 1712, the output module maps the selected DER profiles to a set of actionable tasks that each DER contributor is capable of making according to its skill set.

In step 1714, the request is routed to the DER contributor associated with the selected DER profile or set of DER profiles by, for example, the output module 1020H.

In an optional step 1716, feedback is collected from the DER program manager who initiated the request and/or based on the behavior of the DER contributors associated with the selected DER profiles. The feedback may be collected by the feedback module 1020G.

While various embodiments have been described above, it should be understood that they have been presented by way of example only, and not limitation. Thus, the breadth and scope of a preferred embodiment should not be limited by any of the above-described exemplary embodiments but should be defined only in accordance with the following claims and their equivalents.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

Although the present disclosure has been described with reference to specific features and embodiments thereof, it is evident that various modifications and combinations can be made thereto without departing from scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

What is claimed is:

1. A computer implemented method comprising:
   receiving a Distributed Energy Resource (DER) program request for resources, the request including at least one normalized request attribute;
   accessing a plurality of DER profiles, each profile associated with a DER contributor capable of contributing a resource to the request, and including a plurality of attribute scoring metrics and a plurality of performance indicators of the DER contributor;
   calculating, using a neural network, an initial value for each DER profile based on the at least one normalized request attribute and the plurality of scoring metrics;
   calculating a fitness metric for each DER profile based on the initial value using the neural network having weights based on the plurality of performance indicators;
   selecting one or more DER profiles based on a stochastic model using the fitness metric; and
   routing the DER program request to one or more DER contributors associated with the selected one or more DER profiles thereby allowing the DER contributor to respond to contribute the resource the request.

2. The method of claim 1, further comprising the updating of at least one of the pluralities of scoring metrics of the selected DER profile based on whether a response to the DER program request provided by the DER contributor was validated and accepted.

3. The method of claim 1, further including updating the scoring metrics based on DER data collection and analysis, and wherein the calculating an initial value is based on updated scoring metrics.

4. The method of claim 1, further comprising updating of at least one of the plurality of performance indicators based on:
   whether the DER contributor accepts the request; or
   an elapsed amount of time for the selected DER contributor to accept the request; or
   whether the DER contributor provided a response to the request; or
   an elapsed amount of time for the selected DER contributor to provide a response to the request.

5. The method of claim 1, further comprising pre-selecting of a portion of the plurality of DER profiles based on the fitness metric.

6. The method of claim 1, wherein the stochastic model is based on one of:
   a lottery; or
   a Gaussian distribution.

7. The method of claim 1 further including:
   dividing the request into one or more sub-requests, each sub request having at least one request attribute.

8. The method of claim 7 wherein the accessing a plurality of DER profiles, calculating an initial value for each DER profile, calculating a fitness metric for each DER profile, selecting one or more DER profiles, and routing are performed for each sub-request.

9. A system comprising:
   a non-transitory memory storage comprising instructions; and
   one or more processors in communication with the memory storage, wherein the one or more processors execute the instructions to:
      receive a DER program request for resources, the request including at least one normalized request attribute;
      access a plurality of DER profiles, each profile associated with a DER contributor capable of providing a resource to address the request and including a plurality of attribute scoring metrics and a plurality of performance indicators of the DER contributor;
      calculate updated DER scoring metrics to be used in each profile;
      calculate an initial value for each DER profile using a neural network and based on the at least one normalized request attribute and the plurality of scoring metrics;
      calculate a fitness metric for each DER profile based on the initial value using the neural network having weights based on the plurality of performance indicators;
      select one or more DER profiles based on a stochastic model using the fitness metric; and
      map one or more of the DER profiles to actionable tasks that each DER is capable of making according to a DER contributor skill set, and route the request to one or more DER contributors associated with the one or more DER profiles thereby allowing the DER contributor to respond to contribute the resource the request.

10. The system of claim 9 wherein the one or more processors execute the instructions to calculate the fitness metric for each DER profile using unsupervised learning in the neural network.

11. The system of claim 9 wherein the one or more processors execute the instructions to calculate the initial value for each DER profile using supervised learning in the neural network.

12. The system of claim 9 wherein the one or more processors execute the instructions to divide the request into one or more sub-requests, each sub request having at least one request attribute.

13. The system of claim 12 wherein the one or more processors execute the instructions for each sub-request to access the plurality of DER profiles, calculate the initial value for each DER profile, calculate the fitness metric for each DER profile, select one or more DER profiles, and route each sub-request.

14. The system of claim 12 wherein the one or more processors execute the instructions update of at least one of the pluralities of scoring metrics of the selected DER profile based on whether a response to the DER program request provided by the DER contributor was validated and accepted.

15. The system of claim 12 wherein the one or more processors execute the instructions update the scoring metrics based on DER data collection and analysis, and wherein the calculating an initial value is based on updated scoring metrics.

16. The system of claim 12 wherein the one or more processors execute the instructions to update of at least one of the plurality of performance indicators based on:
   whether the DER contributor accepts the request; or
   an elapsed amount of time for a DER contributor to accept the request; or
   whether the DER contributor provided a response to the request; or
   an elapsed amount of time to accept the request.

17. A non-transitory computer readable medium having embodied thereon instructions executable by a processor configured to route and allocate a DER program request, the instructions causing the processor to perform a method comprising:
   receiving a DER program request for at least one DER resource, the request including at least one normalized request attribute;
   accessing a plurality of DER profiles, each profile associated with a DER contributor capable of contributing a resource to the request and including a plurality of attribute scoring metrics and a plurality of performance indicators of the DER contributor;
   calculating an initial value for each DER profile using a neural network and based on the at least one normalized request attribute and the plurality of scoring metrics;
   calculating a fitness metric for each DER profile based on the initial value using the neural network having weights based on the plurality of performance indicators;
   selecting one or more DER profile profiles based on a stochastic model using the fitness metric; and
   routing the request to the one or more DER contributors associated with the one or more profiles thereby allowing the DER contributor to respond to contribute the resource the request.

18. The non-transitory computer readable medium of claim 17, the method further including:
   dividing the request into one or more sub-requests, each sub request having at least one request attribute.

19. The non-transitory computer readable medium of claim 18 wherein for each sub request, the accessing a plurality of DER profiles, calculating an initial value for each DER profile, calculating a fitness metric for each DER profile, selecting one or more DER profiles, and routing are performed.

20. The non-transitory computer readable medium of claim 19 wherein the method further includes calculating the fitness metric for each DER profile using unsupervised learning in the neural network and calculating the initial value for each DER profile using supervised learning in the neural network.

* * * * *